（12） United States Patent
Wachi et al.

(10) Patent No.: US 10,892,684 B2
(45) Date of Patent: Jan. 12, 2021

(54) CIRCUIT FOR A SWITCHING POWER SUPPLY

(71) Applicant: Rohm Co., Ltd., Kyoto (JP)

(72) Inventors: Takatsugu Wachi, Kyoto (JP); George G. Tan, Jr., Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/690,660

(22) Filed: Nov. 21, 2019

(65) Prior Publication Data
US 2020/0169174 A1 May 28, 2020

(30) Foreign Application Priority Data
Nov. 22, 2018 (JP) .................................. 2018-219581

(51) Int. Cl.
H02M 3/158 (2006.01)
H02M 1/088 (2006.01)

(52) U.S. Cl.
CPC ......... H02M 3/1588 (2013.01); H02M 1/088 (2013.01)

(58) Field of Classification Search
CPC ............... H02M 3/1588; H02M 1/088; H02M 2001/0025; H02M 1/36; H02M 1/14; H02M 2001/0032
See application file for complete search history.

(56) References Cited

U.S. PATENT DOCUMENTS

| 10,589,636 | B2* | 3/2020 | Yamaguchi | H03K 17/56 |
| 2012/0326688 | A1* | 12/2012 | Sun | H02M 3/1588 323/283 |
| 2016/0164415 | A1 | 6/2016 | Yamane | |
| 2018/0041123 | A1* | 2/2018 | Matsushima | H02M 3/1588 |

FOREIGN PATENT DOCUMENTS

JP 2016-111845 6/2016

* cited by examiner

Primary Examiner — Adolf D Berhane
Assistant Examiner — Afework S Demisse
(74) Attorney, Agent, or Firm — Fish & Richardson P.C.

(57) ABSTRACT

An output transistor is made to perform switching operation synchronous with a clock signal in a current mode based on an error voltage, which is commensurate with the difference between a feedback voltage commensurate with an output voltage and a reference voltage, and a slope voltage, which is commensurate with a current that passes through the output transistor. Based on the result of comparison of the error voltage with a skip threshold voltage, a skip signal is generated. When the skip signal turns to high level in response to a light load, the switching operation is stopped. Thereafter, when the skip signal turns back to low level, the output transistor is turned on asynchronously with the clock signal.

10 Claims, 14 Drawing Sheets

| SET | RST | CNT | G1 | G2 |
|-----|-----|------|------|------|
| H | L | H | H | L |
| L | H | L | L | H |
| L | L | HOLD | HOLD | HOLD |

H:HIGH LEVEL
L:LOW LEVEL

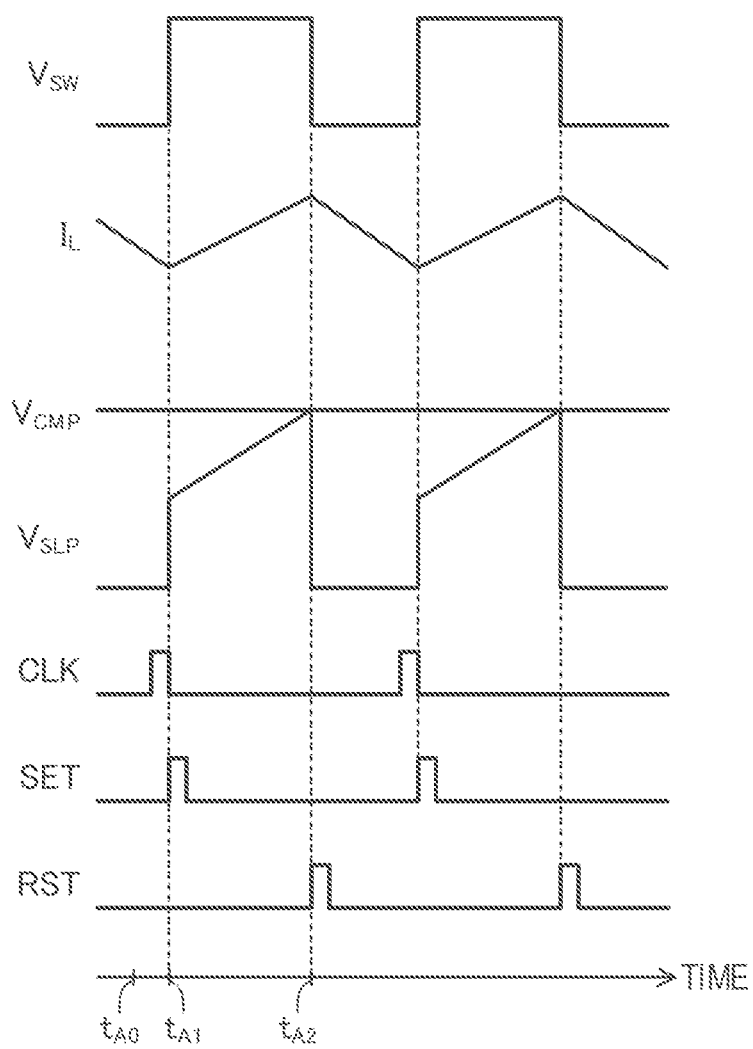

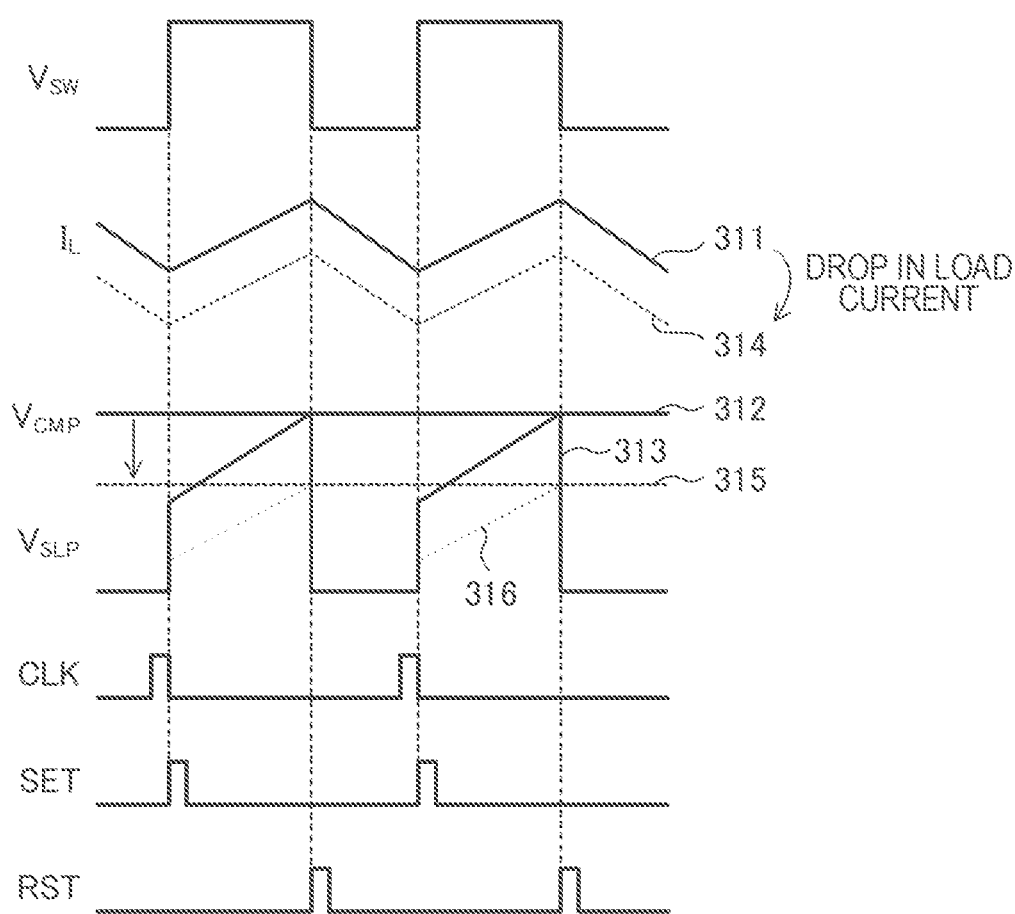

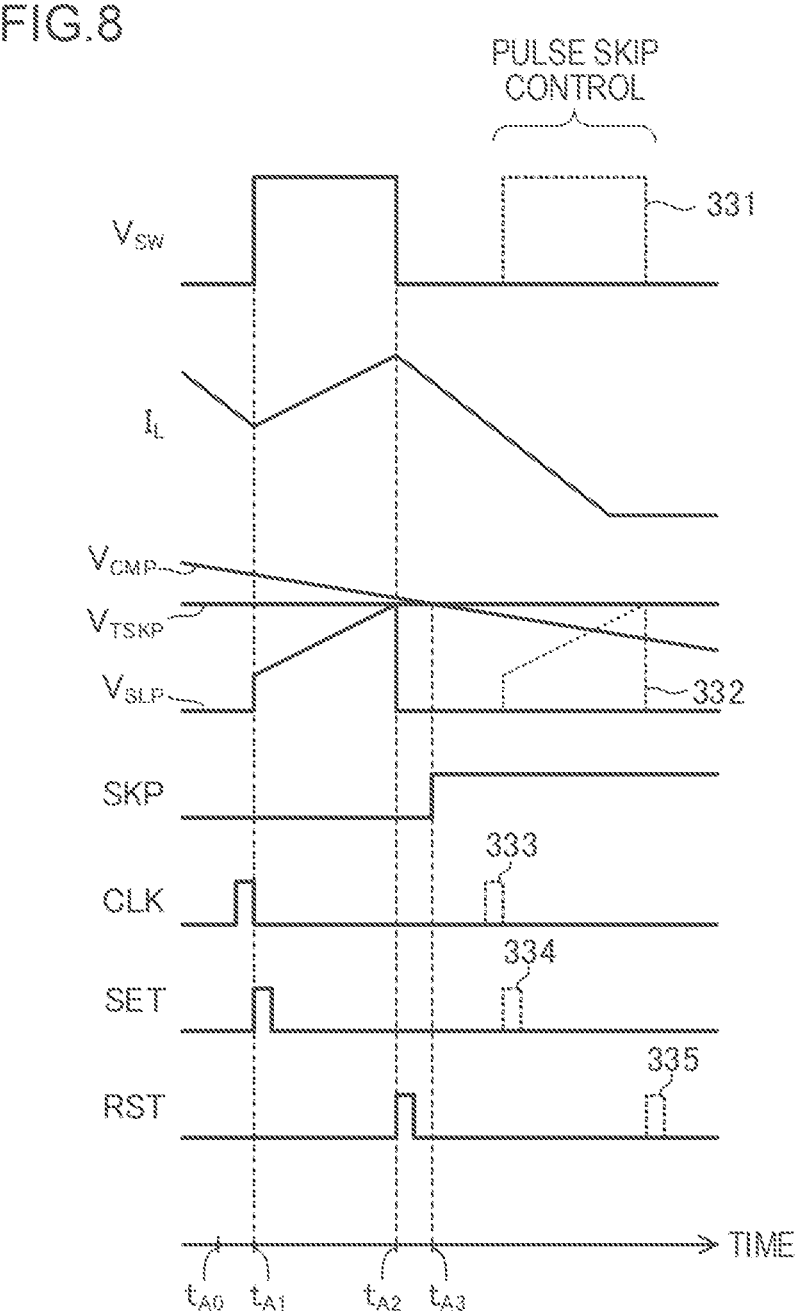

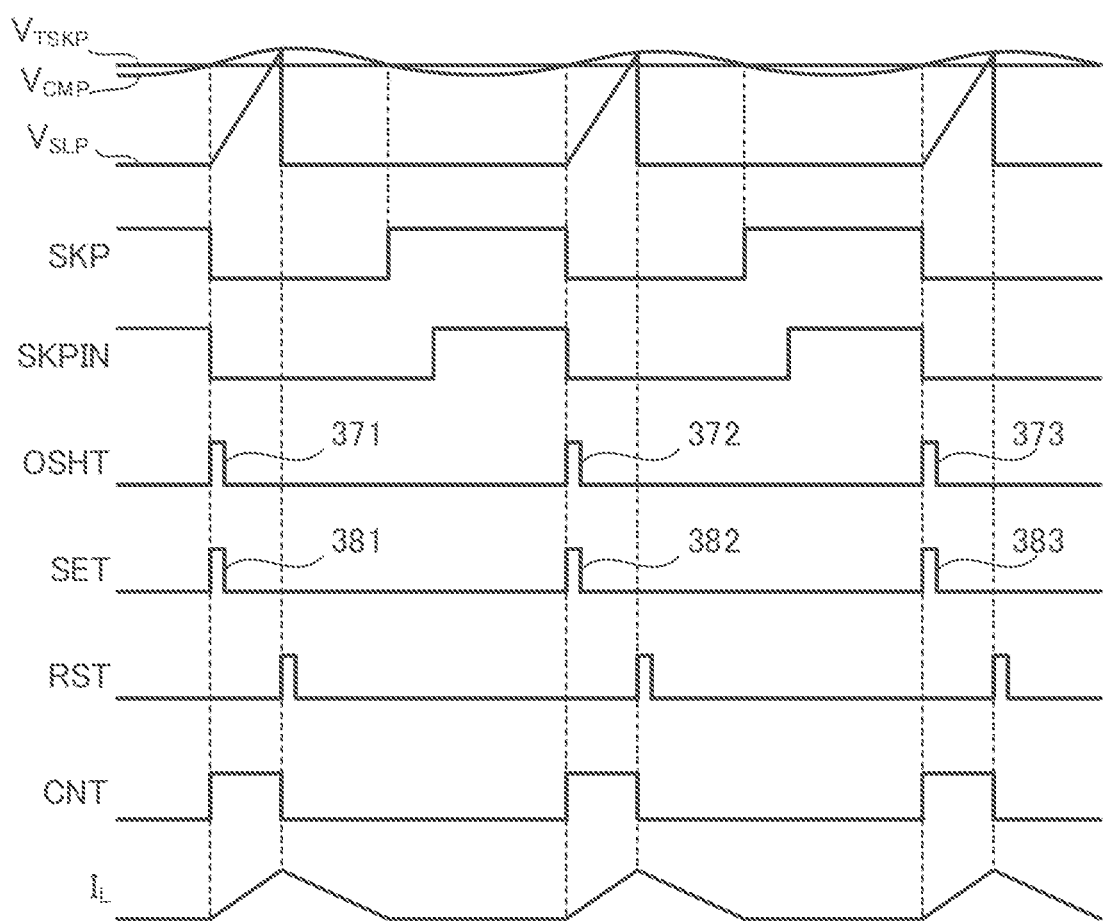

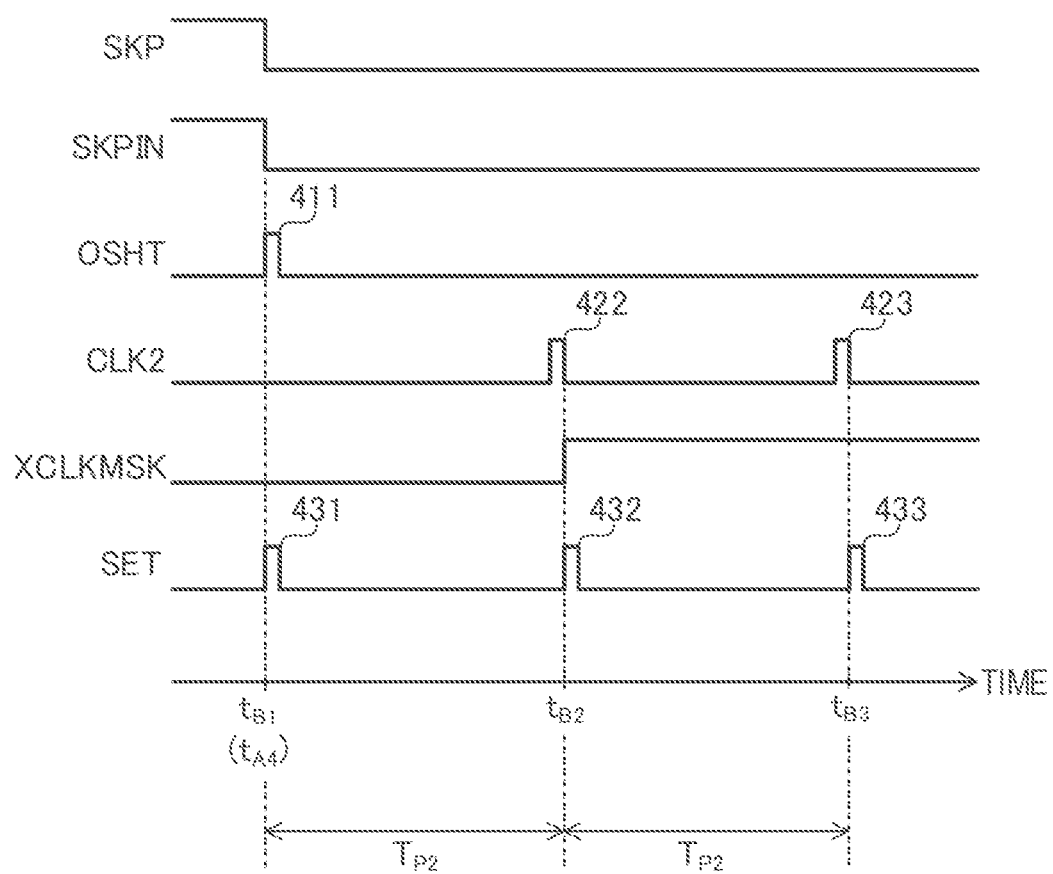

FIG.14A
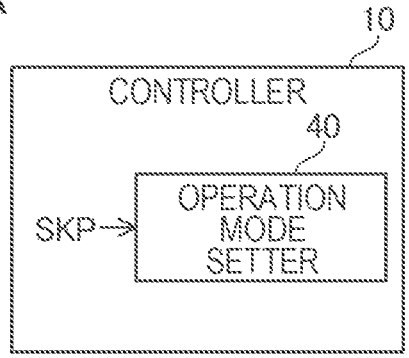
FIG.14B
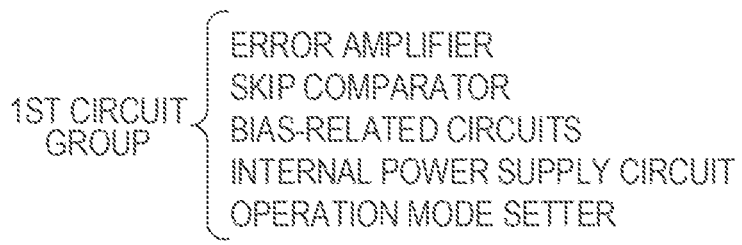
FIG.14C
1ST CIRCUIT GROUP
- ERROR AMPLIFIER
- SKIP COMPARATOR
- BIAS-RELATED CIRCUITS
- INTERNAL POWER SUPPLY CIRCUIT
- OPERATION MODE SETTER
FIG.15
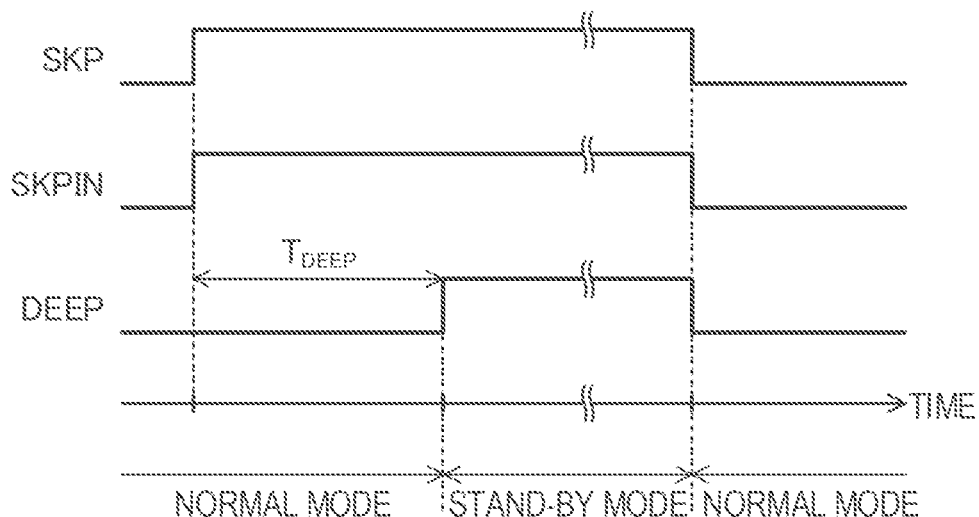

| SSEND | V_TSKP |
|---|---|
| L | $V_{TSKP1}$ (e.g., 30 mV) |
| H | $V_{TSKP2}$ (e.g., 120 mV) |

CIRCUIT FOR A SWITCHING POWER SUPPLY

This nonprovisional application claims priority under 35 U.S.C. 119(a) on Patent Application No. 2018-219581 filed in Japan on Nov. 22, 2018, the entire contents of which are hereby incorporated by reference.

BACKGROUND OF THE INVENTION

1. Field of the Invention

The present invention relates to a circuit for a switching power supply, as used to build a switching power supply device.

2. Description of Related Art

FIG. 20 shows a configuration example of a switching power supply device 900 that operates in a current mode. The switching power supply device 900 is a step-down DC-DC converter that produces an output voltage Vout through the switching of an input voltage Vin with an output transistor 911. Between the output transistor 911 and an output capacitor 913, to which the output voltage Vout is applied, an inductor 912 is arranged. In the switching power supply device 900, an error voltage Vcmp commensurate with the difference between a feedback voltage Vfb commensurate with the output voltage Vout and a reference voltage Vref is generated in an error amplifier 914, and by use of the error voltage Vcmp and current information on the output transistor 911 (and hence current information on the inductor 912), the output transistor 911 is controlled so that the output voltage Vout is stabilized at a desired target voltage.

In the switching power supply device 900 in FIG. 20, synchronously with a clock signal clk, a set signal set for specifying the turning-on of the output transistor 911 is generated. When a slope voltage Vslp commensurate with the current passing in the output transistor 911 reaches the error voltage Vcmp, a reset signal rst is issued so that the output transistor 911 is turned off.

Patent Document 1: Japanese Patent Application filed as No. 2016-111845

In the switching power supply device 900 operating in the current mode, it is in principle inevitable that the error voltage Vcmp varies in accordance with the current through the load that is fed with the output voltage Vout. In a situation where, based on the error voltage Vcmp, the load is judged to be light, light-load control is possible as by masking the clock signal clk and thereby stopping the switching by the output transistor 911. Light-load control helps reduce switching loss under a light load After light-load control is started, when a drop in the output voltage Vout is detected, the output capacitor 913 should be charged via the output transistor 911. However, with the configuration in FIG. 20, the set signal set is generated synchronously with the clock signal clk, and in addition the detection signal for a drop in the output voltage Vout and the clock signal clk are not synchronous with each other. This makes it impossible to turn on the output transistor 911 immediately at the time point at which to charge the output capacitor 913. Consequently, the output voltage Vout may contain large ripples (this phenomenon will be described in detail later). Reducing ripples in the output voltage Vout is crucial, and so is smooth transition to PWM control.

SUMMARY OF THE INVENTION

An object of the present invention is to provide a circuit for a switching power supply as contributes to reduced ripples in the output voltage. More specifically, an object of the present invention is to provide a circuit for a switching power supply as contributes to reduced ripples in the output voltage under a light-load control and to smooth transition to PWM control.

A circuit for a switching power supply according to the present invention is a circuit for a switching power supply that generates an output voltage from an input voltage through switching operation by an output transistor, and includes: a controller including an error amplifier configured to generate an error voltage commensurate with the difference between a feedback voltage commensurate with the output voltage and a reference voltage and a slope voltage generator configured to generate a slope voltage commensurate with the current passing in the output transistor. The controller is configured to control the output transistor based on the error voltage and the slope voltage. The controller further includes a skip comparator configured to generate a skip signal based on the result of comparison between the error voltage and a predetermined skip threshold voltage. The controller is configured, when the skip signal is at a first level, to perform basic switching control in which the controller performs the switching operation synchronous with a clock signal; when the skip signal turns from the first level to a second level different from the first level during the basic switching control, to perform skip control in which the controller stops the switching operation synchronous with the clock signal; and thereafter when the skip signal turns from the second level to the first level, to turn on the output transistor asynchronously with the clock signal in the basic switching control.

Specifically, for example, in the above-described circuit for a switching power supply, preferably, in the basic switching control, as the current through the load supplied with the output voltage increases, the error voltage varies in a first direction and, as the current through the load decreases, the error voltage varies in a second direction opposite to the first direction. Preferably, the skip comparator is configured, when the error voltage varies in the second direction until the magnitude relationship between the error voltage and the skip threshold voltage is reversed, to turn the skip signal from the first level to the second level and, when the error voltage varies in the first direction until the magnitude relationship between the error voltage and the skip threshold voltage is reversed, to turn the skip signal from the second level to the first level. Preferably, the error amplifier is configured to make the error voltage vary in the first direction as the output voltage falls. Preferably, the controller is configured, after the skip control is started, when as a result of the output voltage falling and accordingly the error voltage varying in the first direction the skip signal turns from the second level to the first level, to turn on the output transistor asynchronously with the clock signal in the basic switching control.

Specifically, for another example, in the above-described circuit for a switching power supply, preferably, the controller includes a specific-signal generator configured to generate a specific signal in response to the skip signal turning from the second level to the first level, and the controller is configured to turn on the output transistor based on the specific signal.

More specifically, for example, in the above-described circuit for a switching power supply, preferably, the controller is configured, after turning on the output transistor based on the specific signal, to determine the turn-off timing of the output transistor based on the result of comparison between the error voltage and the slope voltage.

Still more specifically, for example, in the above-described circuit for a switching power supply, preferably, the controller is configured, if within a predetermined time of the time point that the skip signal turns from the second level to the first level, the skip signal does not turn again from the second level to the first level, to thereafter perform PWM control of the output transistor at a predetermined frequency based on the error voltage and the slope voltage.

Still more specifically, for example, in the above-described circuit for a switching power supply, preferably the controller is configured, if within the predetermined time of the time point that the skip signal turns from the second level to the first level, the skip signal turns again from the second level to the first level, to turn on the output transistor again based on the specific signal in response to the skip signal turning so again.

For another example, in the above-described circuit for a switching power supply, preferably, the controller is configured to keep the output transistor on for a predetermined on period based on the specific signal and thereafter turns off the output transistor.

For another example, in the above-described circuit for a switching power supply, preferably, there can be further provided an operation mode setter configured to set the operation mode of the circuit for a switching power supply. Preferably, the operation mode setter is configured to set the operation mode to a first mode in which the operation mode setter enables, along with the error amplifier and the skip comparator, a particular circuit in the circuit for a switching power supply to operate or a second mode m which the operation mode setter enables the error amplifier and the skip comparator to operate while disabling the particular circuit from operating so as to reduce electric power consumption in the circuit for a switching power supply as compared with in the first mode. Preferably, the operation mode setter is configured, if with the operation mode set to the first mode after the skip signal turns from the first level to the second level the skip signal is kept at the second level for a predetermined time or more, to switch the operation mode to the second mode.

For another example, in the above-described circuit for a switching power supply, preferably, the controller further includes a soft-starting voltage generator configured, at the start-up of the circuit for a switching power supply, to generate a soft-starting voltage of which the potential rises gradually from a potential lower than the reference voltage toward a potential higher than the reference voltage. Preferably, the error amplifier is configured, when the soft-starting voltage is lower than the reference voltage, to generate the error voltage commensurate with the difference between the feedback voltage and the soft-starting voltage and, when the soft-starting voltage is higher than the reference voltage, to generate the error voltage commensurate with the difference between the feedback voltage and the reference voltage. Preferably, the skip comparator is configured, when the error voltage is higher than the skip threshold voltage, to output the skip signal at the first level and, when the error voltage is lower than the skip threshold voltage, to output the skip signal at the second level. Preferably, the controller is configured to set the skip threshold voltage lower during, than after, the period up to when the soft-starting voltage reaches a predetermined voltage equal to or higher than the reference voltage.

For another example, in the above-described circuit for a switching power supply, preferably, the circuit for a switching power supply is formed using a semiconductor integrated circuit.

According to the present invention, it is possible to provide a circuit for a switching power supply as contributes to reduced ripples in the output voltage.

BRIEF DESCRIPTION OF THE DRAWINGS

FIG. 6 is a timing chart of basic switching control in the first embodiment of the present invention;

FIG. 7 is a diagram showing how waveforms change with a drop in a load current in the first embodiment of the present invention;

FIG. 8 is a timing chart illustrating pulse skip control in the first embodiment of the present invention;

FIG. 12 is a diagram showing waveforms under a given condition in the first embodiment of the present invention;

FIG. 13 is a timing chart illustrating operation according to a second embodiment of the present invention;

FIGS. 14A, 14B, and 14C are diagrams illustrating operation mode setting in a fourth embodiment of the present invention;

FIG. 15 is a diagram showing a relationship between some signals and operation modes set in the fourth embodiment of the present invention;

DETAILED DESCRIPTION OF PREFERRED EMBODIMENTS

Hereinafter, examples embodying the present invention will be described specifically with reference to the accompanying drawings. Among the diagrams referred to in the course, the same parts are identified by the same reference signs, and in principle no overlapping description of the same parts will be repeated. In the present description, for the sake of simple description, symbols and other designations referring to information, signals, physical quantities, elements, components, and the like are occasionally used with the names of the corresponding information, signals, physical quantities, elements, components, and the like omitted or abbreviated. For example, an output transistor mentioned later and identified by the reference sign "M1" (see FIG. 1) is sometimes designated as "output transistor M1" and is other times abbreviated to "transistor M1", those designations both referring to the same entity.

First, some of the terms used to describe embodiments will be defined.

"Ground" refers to a conducting part at a reference potential of 0 V (zero volts), or to such a reference potential itself. In the embodiments, any voltage mentioned with no particular reference mentioned is a potential relative to a ground. "Level" denotes the level of a potential, and with respect to, any signal or voltage, "high level" has a higher potential than "low level".

With respect to any signal or voltage, a switch from low level to high level is referred to as "up edge", and the time point of a switch from low level to high level is referred to as "up-edge time point". Likewise, with respect to any signal or voltage, a switch from high level to lower level is referred to as "down edge", and the time point of a switch from high level to low level is referred to as "down-edge time point".

With respect to any transistor configured as an FET (field-effect transistor), "on state" refers to a state where the drain-source channel of the transistor is conducting, and "off state" refers to a state where the drain-source channel of the transistor is not conducting (cut off). In the following description, being in on or off state is often mentioned simply as being on or off respectively. With respect to any transistor, a switch from off state to on state is referred to as turning-on, and a switch from on state to off state is referred to as turning-off.

First Embodiment

Figure 1:
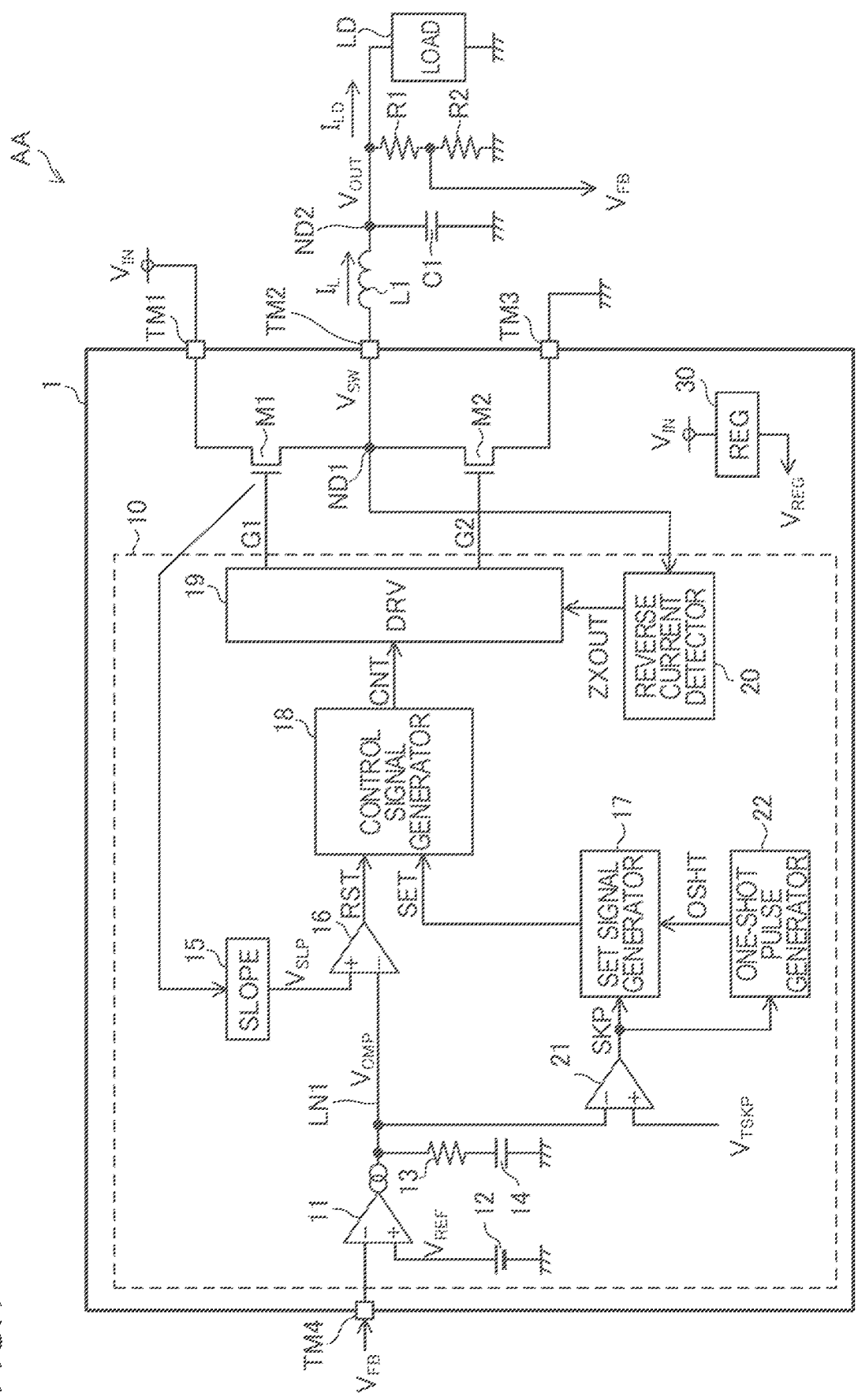
FIG. 1 is an overall configuration diagram of a switching power supply device according to a first embodiment of the present invention.

A first embodiment of the present invention will be described FIG. 1 is an overall configuration diagram of a switching power supply device AA according to the first embodiment. The switching power supply device AA in FIG. 1 is configured as a step-down DC-DC converter that produces from an input voltage $V_{IN}$ an output voltage $V_{OUT}$ lower than the input voltage $V_{IN}$. The input voltage $V_{IN}$ and the output voltage $V_{OUT}$ are each a positive direct-current voltage. The switching power supply device AA includes a power IC 1 as a circuit for a switching power supply and, as components provided externally outside the power IC 1, an inductor L1, an output capacitor C1, and feedback resistors R1 and R2.

Figures 2, 3:
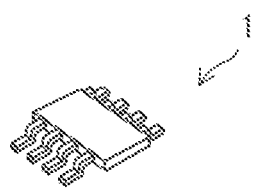
FIG. 2 is an exterior view of a power IC according to the first embodiment of the present invention.
FIG. 3 shows a relationship among a plurality of signals in the first embodiment of the present invention.

FIG. 2 shows an example of the exterior appearance of the power IC 1. The power IC 1 is an electronic component (semiconductor device) formed by sealing a semiconductor integrated circuit in a casing (package) made of resin, with various circuits constituting the power IC 1 integrated with semiconductor circuit elements. The casing of the electronic component as the power IC 1 is provided with a plurality of external terminals that are exposed out of the casing, to outside the power IC 1. The number of the external terminals shown in FIG. 2 is merely an example.

As part of the external terminals provided on the power IC 1, external terminals TM1 to TM4 are shown in FIG. 1. The external terminal TM1 is fed with the input voltage $V_{IN}$. The external terminal TM2 is connected to a node ND1, which will be described later. The external terminal TM3 is connected to a ground. The external terminal TM4 is fed with a feedback voltage $V_{FB}$, which will be described later.

The power IC 1 includes an output transistor M1, a synchronous rectification transistor M2, a controller 10, and an internal power supply circuit 30. The power IC 1 can further include any block (such as a reset circuit, a protection circuit, and the like) that neither belongs to the controller 10 nor is the internal power supply circuit 30; here, however, unless necessary, such blocks will be omitted from illustration and description. The transistors M1 and M2 are configured as N-channel MOSFETs (metal-oxide-semiconductor field-effect transistors). A modification is however possible in which the transistor M1 is configured as a P-channel MOSFET.

The switching power supply device AA performs direct-current to direct-current conversion by synchronous rectification with the output transistor M1 and the synchronous rectification transistor M2. The transistor M2 can be replaced with a diode, in which case the switching power supply device AA performs direct-current to direct-current conversion by asynchronous rectification. With respect to any transistor including the transistors M1 and M2, the period in which the transistor is in on state is often referred to as "on period", and the period in which the transistor is in off state is often referred to as "off period".

The drain of the transistor M1 is connected to the external terminal TM1, and is thus fed with the input voltage $V_{IN}$. The source of the transistor M1 and the drain of the transistor M2 are connected together at a node ND1. The source of the transistor M2 is connected to the external terminal TM3, and is thus connected to the ground. The voltage that appears at the node ND1 is referred to as the switching voltage, and is represented by the symbol "$V_{SW}$". One end of the inductor L1 is connected to the external terminal TM2, and the other end of the inductor L1 is connected to a node ND2. The output voltage $V_{OUT}$ appears at the node ND2. Between the node ND2 and the ground, the output capacitor C1 is connected. Also provided between the node ND2 and the ground is a series circuit composed of the feedback resistors R1 and R2. Thus, at the connection node between the feedback resistors R1 and R2, a feedback voltage $V_{FB}$, which is a division voltage of the output voltage $V_{OUT}$, appears. The connection node between the feedback resistors R1 and R2 is connected to the external terminal TM4, and thus the feedback voltage $V_{FB}$ is applied to the external terminal TM4. In a case where the transistor M1 is configured as a P-channel MOSFET, the relationship between the source and the drain of the transistor M1 is reversed (specifically, the source and the drain of the transistor M1 are connected to the external terminal TM1 and the node ND1 respectively).

In FIG. 1, the symbol "LD" represents a load connected between the node ND2 and the ground. The load LD can be any load (such as a microcomputer) that operates from the output voltage $V_{OUT}$. The current passing from the node ND2 to the load LD and consumed by the load LD is referred to as the load current, and is represented by the symbol "$I_{LD}$". The current that passes in the inductor L1 is referred to as the inductor current, and is represented by the symbol "$I_L$".

Based on the feedback voltage $V_{FB}$ and a slope voltage $V_{SLP}$, which will be described later, that is commensurate with the current passing in the output transistor M1, the controller 10 controls the gate voltage of the transistors M1 and M2 to turn on and off the transistors M1 and M2, and thereby stabilizes the output voltage $V_{OUT}$ at a predetermined target voltage $V_{TG}$ (e.g., 5 V). The controller 10 in FIG. 1 is configured to be capable of driving the transistors M1 and M2 by what is generally called a current-mode control method. The internal power supply circuit 30 produces a predetermined internal supply voltage $V_{REG}$ from the input voltage $V_{IN}$. The various circuits in the controller 10 operate from the internal supply voltage $V_{REG}$.

The internal configuration of the controller 10 will be described. The controller 10 includes an error amplifier 11, a reference voltage source 12, a resistor 13, a capacitor 14, a slope voltage generator 15, a main comparator 16, a set signal generator 17, a control signal generator 18, a gate driver 19, a reverse current detector 20, a skip comparator 21, and a one-shot pulse generator 22. For the sake of convenience of description for the time being, the skip comparator 21 and the one-shot pulse generator 22 will be ignored, and the other bocks in the controller 10 will be described.

The error amplifier 11 is a transconductance amplifier of a current output type. The inverting input terminal of the error amplifier 11 is fed with the feedback voltage $V_{FB}$, which is applied to the external terminal TM4. The reference voltage source 12 generates a reference voltage $V_{REF}$, which is a predetermined positive direct-current voltage. The reference voltage $V_{REF}$ is fed to the non-inverting input terminal of the error amplifier 11. The output terminal of the error amplifier 11 is connected to a line LN1, which is a wiring conductor inside the power IC 1. In a case where the power IC 1 is provided with a soft-starting function, the error amplifier 11 is fed also with a soft-starting voltage, this function, however, will be described later, and will be ignored for the time being.

The error amplifier 11 generates an error voltage $V_{CMP}$ that is commensurate with the difference between a negative-side target voltage and a positive-side target voltage. With the soft-starting function ignored, the negative-side and positive-side target voltages are the feedback voltage $V_{FB}$ and the reference voltage $V_{REF}$ respectively. The error amplifier 11 supplies to and retrieves from the line LN1 electric charge attributable to an error current signal commensurate with the difference between the negative-side and positive-side voltages, and thereby produces the error voltage $V_{CMP}$ on the line LN1. Specifically, when the positive-side target voltage is higher than the negative-side target voltage, the error amplifier 11 outputs a current attributable to the error current signal toward the line LN1 so that the error voltage $V_{CMP}$ increases; when the negative-side target voltage is higher than the positive-side target voltage, the error amplifier 11 draws in a current attributable to the error current signal from the line LN1 toward the error amplifier 11 so that the error voltage $V_{CMP}$ decreases. As the absolute value of the difference between the negative-side and positive-side target voltages increases, the magnitude of the current attributable to the error current signal increases.

Between the line LN1 and the ground is connected a series circuit composed of the resistor 13 and the capacitor 14. The series circuit functions as a phase compensator, and produces, in coordination with the error amplifier 11, the error voltage $V_{CMP}$ on the line LN1. Specifically, one end of the resistor 13 is connected to the line LN1, and the other end of the resistor 13 is connected via the capacitor 14 to the ground. By properly setting the resistance value of the resistor 13 and the capacitance value of the capacitor 14, it is possible to compensate the signal phase of the error voltage $V_{CMP}$ and thereby prevent oscillation in the output feedback loop. One or both of the resistor 13 and the capacitor 14 can be provided outside the power IC 1 and be externally connected to the power IC 1.

The slope voltage generator 15 generates a slope voltage $V_{SLP}$ commensurate with the current passing in the output transistor M1 during the on period of the output transistor M1 (i.e., the period in which the output transistor M1 is in on state).

The main comparator 16 compares the slope voltage $V_{SLP}$ and the error voltage $V_{CMP}$ to output a signal RST that represents the result of the comparison. The output signal RST of the main comparator 16, only when it is at high level (i.e., only a high-level signal RST), functions as a reset signal and, when it is at low level (i.e., a low-level signal RST), does not function as a reset signal. In the following description, the output of a high-level signal RST from the comparator 16 is occasionally referred to as the issuance or output of a reset signal. The main comparator 16 functions as a reset signal generator that issues a reset signal based on the slope voltage $V_{SLP}$ and the error voltage $V_{CMP}$.

The set signal generator 17 feeds a signal SET to the control signal generator 18. The output signal SET of the set signal generator 17, only when it is at high level (i.e., only a high-level signal SET), functions as a set signal and, when it is at low level (i.e., a low-level signal set) does not function as a set signal. In the following description an event in which the set signal generator 17 outputs a high-level signal SET is occasionally mentioned as the issuance or output of a set signal. The set signal generator 17 can not only issue a set signal periodically but also control whether or not to output a set signal based on signals SKP and OSHT, which will be described above. Details in this respect will be given later.

The control signal generator 18 is composed of logic circuits such as flip-flops. Based on the signal SET from the set signal generator 17 and the signal RST from the main comparator 16, the control signal generator 18 generates and output a control signal CNT that specifies the on/off states of the transistors M1 and M2. Based on the control signal CNT, the gate driver 19 controls a gate signal G1 for the transistor M1 and a gate signal G2 for the transistor M2.

FIG. 3 shows the relationship among the signals SET, RST, CNT, G1 and G2. The signals SET, RST, CNT, G1 and G2 are each a binary signal that is either at high level or at low level at a time.

When, with the signal RST at low level, a high-level signal SET is fed to the control signal generator 18 (i.e., when a set signal is issued), the control signal CNT turns to high level and thereafter, until a high-level signal RST is fed to the control signal generator 18 (i.e., until a reset signal is issued), the control signal CNT is held at high level.

When, with the signal SET at low level, a high-level signal RST is fed to the control signal generator 18 (i.e., when a reset signal is issued), the control signal CNT turns to low level and thereafter, until a high-level signal SET is fed to the control signal generator 18 (i.e., until a set signal is issued), the control signal CNT is held at low level.

During the period in which the signals SET and RST are both at low level, the control signal CNT is kept at the level at which it has been held. In the controller 10, there is no period in which the signals SET and RST are both at high level.

For the sake of convenience, the block composed of the transistors M1 and M2 will be referred to as the output stage. The output stage is in one of a high-output state, a low-output state, and a Hi-Z state. In the high-output state, the transistors M1 and M2 are in on and off states respectively. In the low-output state, the transistors M1 and M2 are in off and on states respectively in the Hi-Z state, the transistors M1 and M2 are both in off state. During the period in which the control signal CNT is at high level, the gate driver 19 keeps the gate signals G1 and G2 at high and low levels respectively and thereby keeps the output stage in the high-output state; during the period in which the control signal CNT is at low level, the gate driver 19 keeps the gate signals G1 and G2 at low and high levels respectively and thereby keeps the output stage in the low-output state. Here, even during the period in which the control signal CNT is at low level, when the reverse current detector 20 outputs a high-level reverse current detection signal ZXOUT, the gate driver 19 switches the output stage from the low-output state to the Hi-Z state and thereafter, until the control signal CNT switches to high level, the gate driver 19 keeps the output stage in the Hi-Z state.

During the on period of the transistor M2, the reverse current detector 20 compares the switching voltage $V_{SW}$ with the potential of the ground to check for a reverse current to the transistor M2 to generate a reverse current detection signal ZXOUT that indicates the result of the check. The reverse current detection signal ZXOUT is fed to the gate driver 19. A reverse current denotes a current that passes from the node ND1 via the transistor M2 to the ground. The reverse current detection signal ZXOUT is at low level when the switching voltage $V_{SW}$ is lower than the potential of the ground, and is high level when the switching voltage $V_{SW}$ is higher than the potential of the ground. Thus, the reverse current detection signal ZXOUT is at low level when the inductor current $I_L$ is passing from the ground via the transistor M2 toward the inductor L1, and is at high level when the inductor current $I_L$ is passing back from the inductor L1 via the transistor M2 to the ground. On detection of a reverse current, the output stage can be brought into the Hi-Z state to cut off the reverse current; it is thus possible to achieve enhanced efficiency under a light load.

Configured as described above, the controller 10 performs, based on the feedback voltage $V_{FB}$ and the slope voltage $V_{SLP}$, switching operation in which the transistors M1 and M2 are turned on and off alternately (i.e., the output stage is switched between the high-output and low-output states). The controller 10 can thereby stabilize the output voltage $V_{OUT}$ at the target voltage $V_{TG}$ commensurate with the reference voltage $V_{REF}$ while achieving enhanced load response by use of current information based on the slope voltage $V_{SLP}$. A control method that uses not only information on the output voltage $V_{OUT}$ (i.e., the feedback voltage $V_{FB}$) but also current information to control the transistors M1 and M2 is called a current-mode control method, and control achieved by such a method is called current-mode control.

Here, turning on and off the transistors M1 and M2 alternately in switching operation (i.e., switching the output stage between the high-output and low-output states) does not exclude the occurrence of the Hi-Z state based on the reverse current detection signal ZXOUT during a transition from the low-output state to the high-output state. To prevent a through current via the transistors M1 and M2 during the switching of the output stage between high-output and low-output states, a dead time in which the transistors M1 and M2 are both off may be inserted.

As a result of switching operation, a voltage with a rectangular waveform of which the level varies substantially between the level of the input voltage $V_{IN}$ and the level of the ground appears as the switching voltage $V_{SW}$. The switching voltage $V_{SW}$ is smoothed by the inductor L1 and the output capacitor C1 to yield a direct-current output voltage $V_{OUT}$.

A supplementary description of the slope voltage $V_{SLP}$ will now be given. The current that passes in the output transistor M1 during the on period of the output transistor M1 is equal to the inductor current $I_L$ during the on period of the output transistor M1; thus the slope voltage $V_{SLP}$ conveys information on the inductor current $I_L$ during the on period of the output transistor M1. That is, the slope voltage $V_{SLP}$ contains current information on the output transistor M1 or the inductor L during the on period of the output transistor M1. A slope voltage $V_{SLP}$ containing such current information can be generated by any of known methods.

Figure 4A:
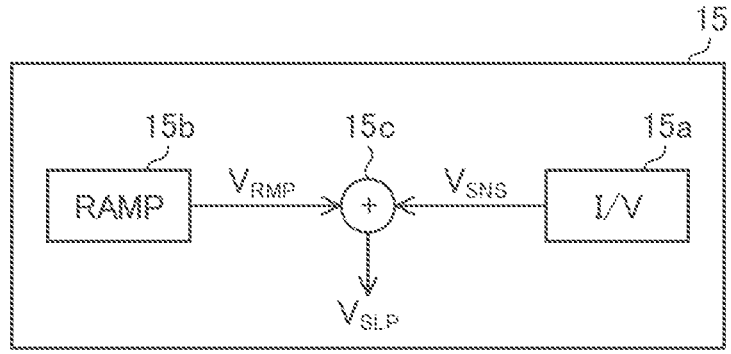
FIGS. 4A and 4B are, respectively, a configuration diagram of a slope voltage generator and a diagram illustrating a slope voltage in the first embodiment of the present invention.
Figure 4B:
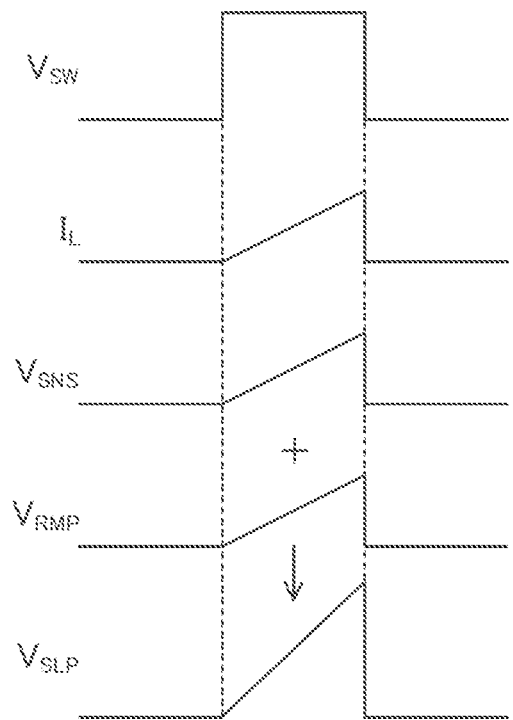

FIG. 4A shows an example of the configuration of the slope voltage generator 15, and FIG. 4B shows the waveforms of a current and voltages related to the slope voltage $V_{SLP}$. The slope voltage generator 15 in FIG. 4A includes an IV converter 15a, a ramp voltage generator 15b, and an adder 15c. The IV converter 15a converts the current that passes in the output transistor M1 during the on period of the output transistor M1 (i.e., the inductor current $I_L$ during the on period of the output transistor M1) into a voltage, and thereby generates a sense voltage $V_{SNS}$ proportional to that current. The ramp voltage generator 15b generates a ramp voltage $V_{RMP}$ with a sawtooth waveform that increases gradually, starting at 0 V, during the on period of the output transistor M1. The adder 15c generates, as a slope voltage $V_{SLP}$, a voltage which is the sum of the sense voltage $V_{SNS}$ and the ramp voltage $V_{RMP}$. Other than during the on period of the output transistor M1, the slope voltage $V_{SLP}$ is at 0 V (though it can have a predetermined bias voltage value). As is well known, adding the ramp voltage $V_{RMP}$ helps suppress oscillation in the output feedback loop in current-mode control.

[Basic Switching Control]

Next, a description will be given of basic switching control that controller 10 can perform when the load current $I_{LD}$ is comparatively high. Here, a state where the load current $I_{LD}$ is comparatively high corresponds to a state where the output signal SKP of the skip comparator 21 is kept at low level. In this state, the skip comparator 21 and the one-shot pulse generator 22 do not function in a significant way. Accordingly in the following description of basic switching control, the skip comparator 21 and the one-shot pulse generator 22 will be ignored.

Figure 5A:
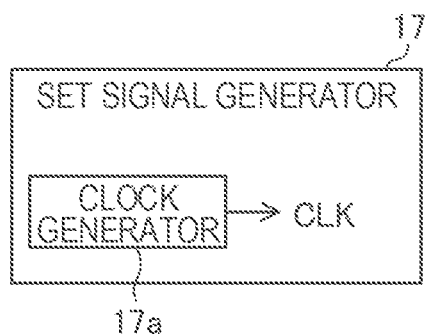
FIGS. 5A and 5B are diagrams illustrating a clock signal and a set signal in the first embodiment of the present invention.
Figure 5B:
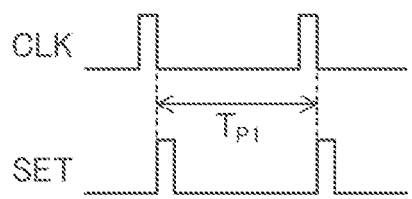

As shown in FIG. 5A, the set signal generator 17 includes a clock generator 17a that generates a clock signal CLK with a predetermined reference frequency $f_{CLK}$. In states including a state where basic switching control is performed, the set signal generator 17 can basically generate and output a signal SET based on the clock signal CLK. As shown in FIG. 5B, the clock signal CLK is a signal in which pulses occur at the reference frequency $f_{CLK}$; every period of the clock signal CLK, a pulse which remains at high level for a momentary period occurs in the clock signal CLK. In the clock signal CLK, the time intervals between the periods in which it is at high level equal the length of time $T_{P1}$ corresponding to one period of the clock signal CLK, that is, the reciprocal of the reference frequency $f_{CLK}$. Where the signal SET is generated based on the clock signal CLK, a down edge in the clock signal CLK triggers the signal SET remaining at high level for a predetermined momentary period. That is, where the signal SET is generated based on the clock signal CLK, the signal SET is a signal that is shifted from the clock signal CLK by the above-mentioned momentary period in the delay direction.

A momentary period mentioned in connection with a pulse or the like has no significant length in the present invention. Accordingly, in the following description, a momentary period is a period sufficiently short to be regarded as zero wherever appropriate. While here the signal SET is generated from the clock signal CLK, in basic switching control, the clock signal CLK itself can be fed as the signal SET to the control signal generator 18. In basic switching control, the occurrence of a down edge in the clock signal CLK can be regarded as corresponding to the issuance of a set signal.

FIG. 6 is a timing chart of basic switching control. Basic switching control will be described starting at time point $t_{40}$, at which the output stage is in the low-output state and the clock signal CLK is at low level. In basic switching control, at time point tan, the slope voltage $V_{SLP}$ is at 0 V. Thereafter, at time point $t_{41}$, when a pulse occurs in the clock signal CLK, the down edge in the clock signal CLK triggers the signal SET remaining at high level for a momentary period; that is, a set signal is issued. In response to the set signal being issued, the control signal CNT switches from low level to high level, so that the output stage switches from the low-output state to the high-output state. During the period in which the output stage is in the high-output state, the inductor current $I_L$ increases gradually, and together the slope voltage $V_{SLP}$ increases gradually. When the slope voltage $V_{SLP}$, which has been lower than the error voltage $V_{CMP}$, reaches the error voltage $V_{CMP}$ at time point $t_{42}$, the output signal RST of the main comparator 16 switches from low level to high level; that is, a reset signal is issued. In response to the reset signal being issued, the control signal CNT switches from high level to low level, so that the output stage switches from the high-output state to the low-output state. With the output stage in the low-output state, the slope voltage $V_{SLP}$ falls quickly down to 0 V, and thus the signal RST turns back to low level. Thereafter, similar operation repeats.

As described above, in basic switching control, in response to a down edge in the clock signal CLK with the reference frequency $f_{CLK}$, a set signal is issued. Thus, the transistors M1 and M2 are subjected to PWM control at the reference frequency $f_{CLK}$. That is, in basic switching control, the input voltage $V_{IN}$ is subjected to pulse-width modulation at the reference frequency $f_{CLK}$ to yield the output voltage $V_{OUT}$. "PWM" is short for pulse-width modulation.

FIG. 7 shows how the waveforms change as the load current $I_{LD}$ falls during basic switching control. In FIG. 7, solid-line waveforms 311, 312, and 313 are the waveforms of the inductor current $I_L$, the error voltage $V_{CMP}$, and the slope voltage $V_{SLP}$ respectively as observed when the load current $I_{LD}$ has a first magnitude, and broken-line waveforms 314, 315, and 316 are the waveforms of the inductor current $I_L$, the error voltage $V_{CMP}$, and the slope voltage $V_{SLP}$ respectively as observed when the load current $I_{LD}$ has fallen from the first magnitude to a second magnitude. In FIG. 7, during the period in which the switching voltage $V_{SW}$ is at low level, the waveforms 313 and 316 coincide.

As will be understood from the circuit configuration described above, in basic switching control, which is a kind of current-mode control, the error voltage $V_{CMP}$ varies in accordance with the load current $I_{LD}$; for example, as shown in FIG. 7, as the magnitude of the load current $I_{LD}$ decreases from the first magnitude to the second magnitude, the average value of the inductor current $I_L$ decreases and together the error voltage $V_{CMP}$ falls. If, while the load current $I_{LD}$ decreases, the error voltage $V_{CMP}$ does not vary, the output capacitor C1 is charged excessively relative to the load current $I_{LD}$, and the output voltage $V_{OUT}$ rises; thus operation proceeds so that the error voltage $V_{CMP}$ falls.

[Pulse Skip Control]

Next, a description will be given of pulse skip control which can be performed when the load current $I_{LD}$ is comparatively low. Pulse skip control is achieved with the skip comparator 21. The inverting and non-inverting input terminals of the skip comparator 21 are fed respectively with the error voltage $V_{CMP}$ and a predetermined skip threshold voltage $V_{TSKP}$. The skip threshold voltage $V_{TSKP}$ has a predetermined positive direct-current voltage value. The skip comparator 21 compares the error voltage $V_{CMP}$ and the skip threshold voltage $V_{TSKP}$ to output a skip signal SKP based on the result of the comparison. Specifically, when the skip threshold voltage $V_{TSKP}$ is higher than the error voltage $V_{CMP}$ the skip comparator 21 output a high-level skip signal SKP; when the error voltage $V_{CMP}$ is higher than the skip threshold voltage $V_{TSKP}$, the skip comparator 21 outputs a low-level skip signal SKP. When the error voltage $V_{CMP}$, and the skip threshold voltage $V_{TSKP}$ are equal, the skip signal SKP is either at low level or at high level. When the skip signal SKP is at high level, the set signal generator 17 can perform pulse skip control.

Pulse skip control will now be described with reference to FIG. M. In the example of operation in FIG. 8, after time point $t_{42}$ until immediately before time point $t_{43}$, $V_{CMP} > V_{TSKP}$, and thus the skip signal SKP is kept at low level. During the period in which the skip signal SKP is at low level (in FIG. 8, the period up to immediately before time point $t_{43}$), basic switching control as described previously can be performed. Accordingly, in the example of operation in FIG. 8, the operation from time point $t_{40}$ to time point $t_{42}$ is as described previously; up to immediately before time point $t_{43}$, basic switching control is performed.

In the example of operation in FIG. 8, it is assumed that, as the load current $I_{LD}$ falls, the error voltage $V_{CMP}$ decreases monotonically from time point $t_{40}$ to after time point $t_{43}$. After time point $t_{42}$, at time point $t_{43}$, which comes before the next pulse occurs in the clock signal CLK, the error voltage $V_{CMP}$ falls below the skip threshold voltage $V_{TSKP}$, with the result that, at time point $t_{43}$, the skip signal SKP switches from low level to high level. When, at time point $t_{43}$, the skip signal SKP switches to high level, thereafter, during the period in which the skip signal SKP is kept at high level, the set signal generator 17 performs pause skip control.

In pulse skip control, basic switching control synchronous with the clock signal CLK is suspended. Specifically, in pulse skip control, based on a high-level skip signal SKP, a signal that masks the clock signal CLK is issued within the set signal generator 17, with the result that the signal SET is kept at low level. Accordingly, after time point $t_{43}$, so long as the skip signal SKP is kept at high level, the signal SET is kept at low level, and thus the output transistor M1 is kept off. In FIG. 8, a broken-line pulse 333 represents a masked pulse m the clock signal CLK, broken-line pulses 334 and 335 represent the pulses that would have occurred in the signals SET and RST if pulse skip control were not performed, and broken-line waveforms 331 and 332 represent the voltage waveforms that would have been observed in the switching voltage $V_{SW}$ and the slope voltage $V_{SLP}$ if pulse skip control were not performed. Pulse skip control as described above helps reduce switching loss and enhance efficiency under a light load.

[Reference Recovery Control]

Figure 9:
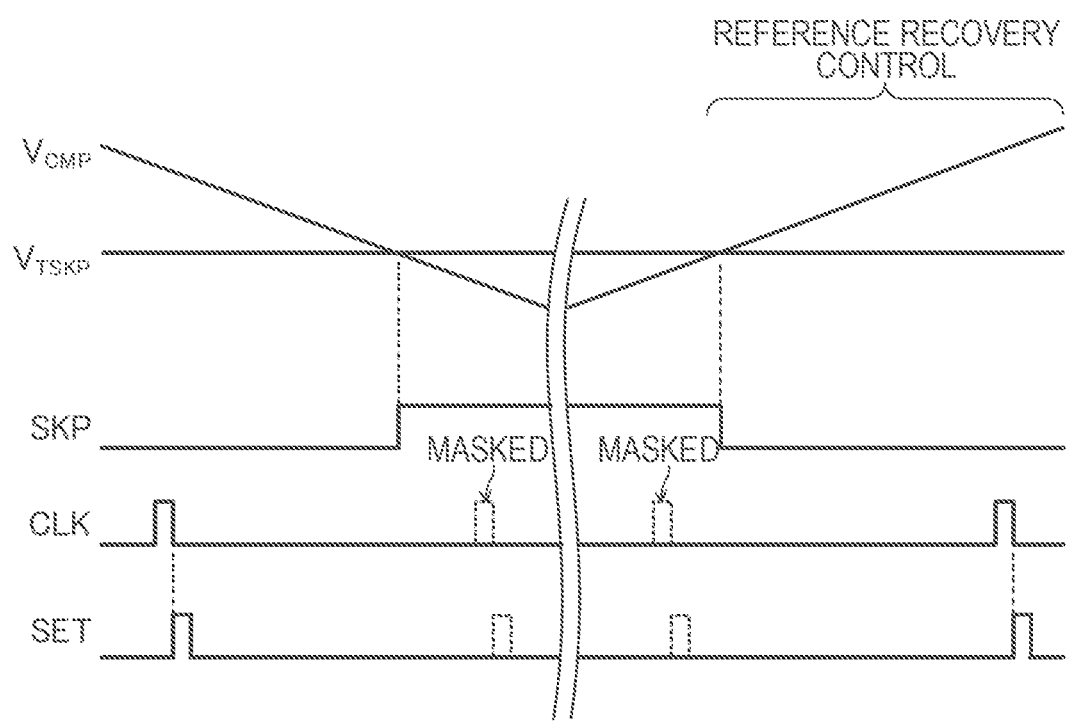
FIG. 9 is a timing chart illustrating reference recovery control in the first embodiment of the present invention.

Next, a description will be given of reference recovery control as control for recovery from pulse skip control. FIG. 9 is a diagram illustrating reference recovery control. In reference recovery control, in response to the skip signal SKP switching from high level to low level, the clock signal CLK stops being masked, and thereafter basic switching control as described previously is simply restarted.

A drop in the output voltage $V_{OUT}$ causes a rise in the error voltage $V_{CMP}$; thus, a switch of the skip signal SKP from high level to low level signifies a drop in the output voltage $V_{OUT}$. When the output voltage $V_{OUT}$ has dropped from the target voltage $V_{TG}$, the output voltage $V_{OUT}$ has to be brought back to the target voltage $V_{TG}$ promptly. However, since the clock signal CLK and the skip signal SKP are not synchronous with each other, in reference recovery control, a comparatively long time can elapse after the skip signal SKP switches to low level until a set signal is issued the next time. Consequently, in reference recovery control, the output voltage $V_{OUT}$ can drop greatly from the target voltage $V_{TG}$ after the clock signal CLK stops being masked until a set signal is issued.

The output voltage $V_{OUT}$ is supposed to be stabilized at the target voltage $V_{TG}$, and thus a great drop in the output voltage $V_{OUT}$ from the target voltage $V_{TG}$ is itself undesirable; besides, in reference recovery control, the output voltage $V_{OUT}$ can exhibit large fluctuations after the clock signal CLK stops being masked (i.e., the output voltage $V_{OUT}$ can exhibit larger ripples). One possible remedy is to issue set signals several times successively to bring the output voltage $V_{OUT}$ back to the target voltage $V_{TG}$ quickly after the clock signal CLK, stops being masked. Even with this remedy adopted, however, the output voltage $V_{OUT}$ can still exhibit larger ripples.

[Improved Recovery Control]

As a solution, the controller 10 is configured to be capable of performing improved recovery control as control for recovery from pulse skip control. Improved recovery control is achieved with the one-shot pulse generator 22 hereinafter occasionally abbreviated as the generator 22) in FIG. 1. When a down edge occurs in the skip signal SKP (i.e., when skip signal SKP switches from high level to low level), in response to the down edge in the skip signal SKP, the generator 22 generates a one-shot pulse and feeds it, in a form contained in a signal OSHT, to the set signal generator 17. In the following description, the generation (delivery) of a one-shot pulse is occasionally referred to as the issuance of a one-shot pulse.

Figure 10:
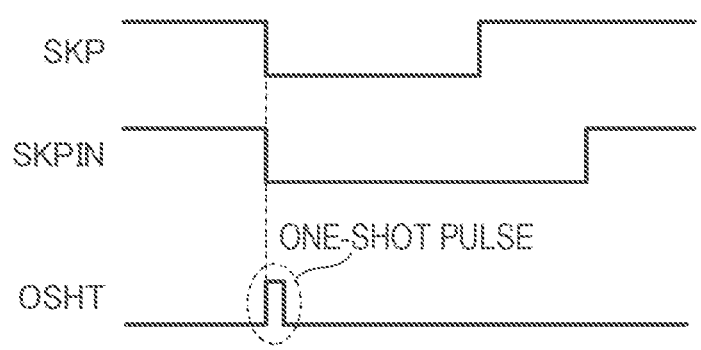
FIG. 10 is a diagram showing a relationship among a plurality of signals related to one-shot pulses in the first embodiment of the present invention.

FIG. 10 shows the relationship among the signals SKP, SKPIN, and OSHT. A circuit (such as the generators 17 and 22) that refers to the skip signal SKP is provided with a filter for eliminating noise from the skip signal SKP, and the noise-eliminated skip signal SKP is dealt with as a signal SKPIN. A circuit (such as the generators 17 and 22) that refers to the skip signal SKP operates based on the signal SKPIN. Specifically, the just-mentioned filter basically so operates that, when the skip signal SKP is at low level, the filter keeps the signal SKPIN at low level and, when the skip signal SKIP is at high level, the filter keeps the signal SKPIN at high level, except that, after a down edge is produced in the signal SKPIN in response to a down edge in the skip signal SKP, the filter keeps the signal SKPIN at low level for a predetermined low-hold period irrespective of the level of the skip signal SKP. Since a down edge in the signal SKPIN occurs in coordination with a down edge in the skip signal SKP, a down edge in the skip signal SKP and a down edge in the signal SKPIN can be understood to be equivalent.

The generator 22 basically keeps the signal OSHT at low level, except that, when a down edge occurs in the skip signal SKP, the down edge in the skip signal SKP (in reality, a down edge in the signal SKPIN) triggers the generator 22 keeping the signal OSHT at high level for a momentary period. A pulse signal that the signal OSHT can contain and that remains at high level for a momentary period is the one-shot pulse.

Figure 11:
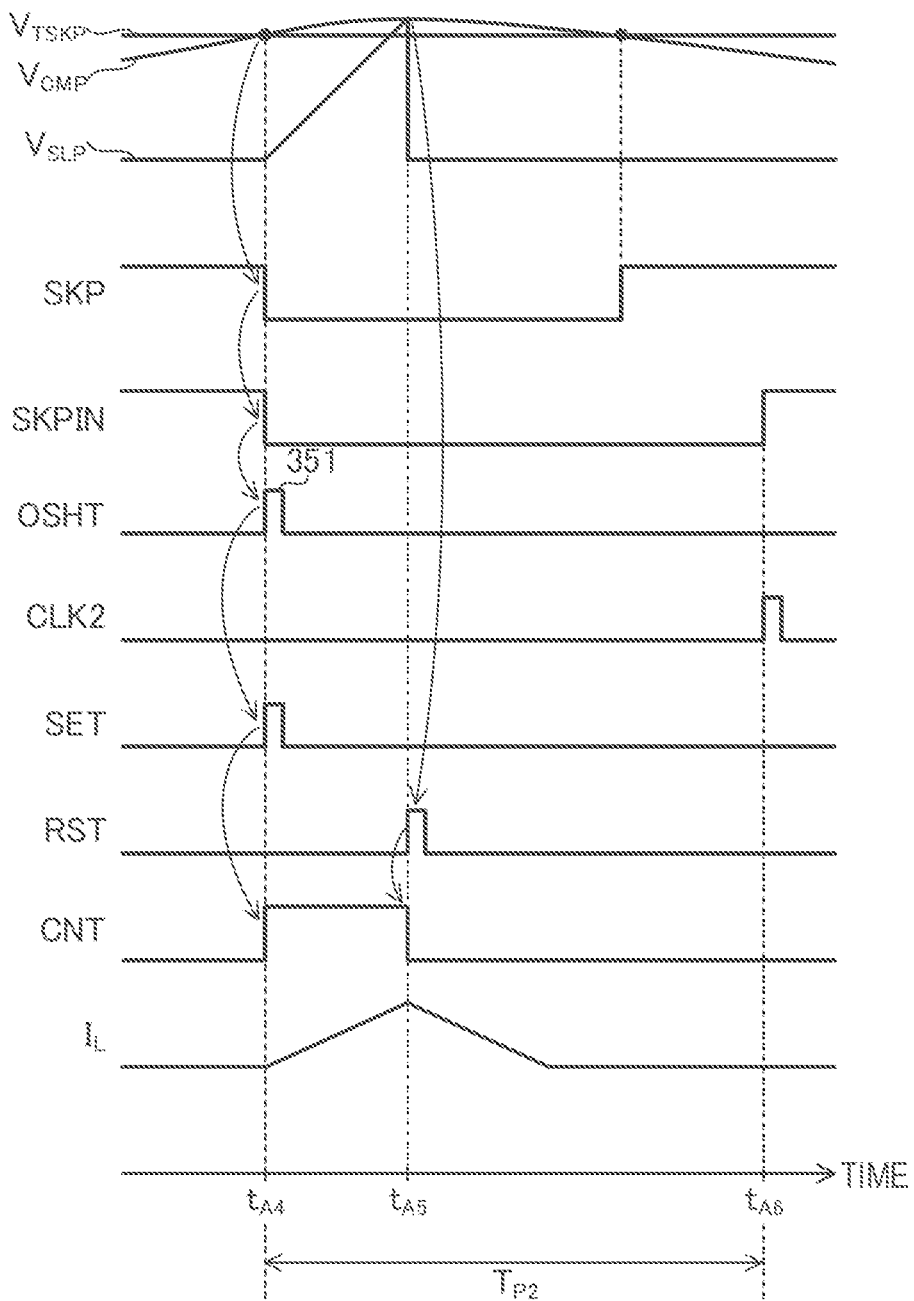
FIG. 11 is a diagram illustrating operation accompanying generation of a one-shot pulse in the first embodiment of the present invention.

FIG. 11 is a timing chart of improved recovery control. Through the operation from time point $t_{40}$ to time point $t_{43}$ described above, basic switching control proceeds and pulse skip control follows (see FIG. 8); suppose that, thereafter, the error voltage $V_{CMP}$, which has fallen below the skip threshold voltage $V_{TSKP}$, increases until, at time point $t_{44}$, it reaches the skip threshold voltage $V_{TSKP}$. Then, at time point $t_{44}$, a down edge occurs in the skip signal SKP and the signal SKPIN so that, the down edge in the skip signal SKP and the signal SKPIN triggers a one-shot pulse (in FIG. 11, corresponding to the pulse 351) occurring in the signal OSHT.

In response to the one-shot pulse occurring in the signal OSHT, the set signal generator 17 keeps the signal SET at high level for a momentary period; that is, it issues a set signal. The issuance of the set signal triggers an up edge occurring in the control signal CNT, so that the output stage switches from the low-output state or the Hi-Z state to the high-output state. Although there are delays in signals etc. in reality, it is here assumed that a down edge in the skip signal SKP and the signal SKPIN at time point $t_{44}$ results in, at time point $t_{44}$, a one-shot pulse being generated, a set signal being issued, and the output stage being switched to the high-output state.

After time point $t_{44}$, when the slope voltage $V_{SLP}$, which has been rising, reaches the error voltage $V_{CMP}$ at time point $t_{45}$, a reset signal (i.e., a high-level signal RST) is issued; thus, the control signal CNT is switched from high level to low level, and the output stage is switched from the high-output state to the low-output state. Though not specifically illustrated, after time point $t_{45}$, when a high-level reverse current detection signal ZXOUT occurs, the output stage is switched to the Hi-Z state.

The set signal generator 17 also sets the time point of occurrence of the one-shot pulse, that is, time point $t_{44}$, as the operation start time point of an internal clock signal. This internal clock signal, of which the operation start time point is set at time point $t_{44}$, is referred to, to distinguish it from the clock signal CLK mentioned previously, as the clock signal CLK2. The clock signal CLK mentioned previously can be understood to correspond to an internal clock signal as it is before pulse skip control is performed. The clock signal CLK2 has a predetermined frequency $f_{CLK2}$ (e.g., 300 kHz). The clock signal CLK2 is a signal in which pulses occur at the frequency $f_{CLK2}$; every period of the clock signal CLK2, a pulse which remains at high level for a momentary period occurs in the clock signal CLK2 (see also FIG. 13, which will be referred to later). In the clock signal CLK2, the time intervals between the periods in which it is at high level equal the length of time $T_{P2}$ corresponding to one period of the clock signal CLK2, that is, the reciprocal of the reference frequency $f_{CLK2}$. At the time point that the length of time $T_{P2}$ has elapsed after time point $t_{44}$, that is, at time point $t_{46}$, a first pulse occurs in the clock signal CLK2 thereafter, pulses occurs in the clock signal CLK2 periodically at the frequency $f_{CLK2}$. The above-mentioned low-hold period in the signal SKPIN can be determined based on the clock signal CLK2; in FIG. 11, at the time point that the length of time $T_{P2}$ corresponding to the reciprocal of the frequency $f_{CLK2}$ has elapsed after time point $t_{44}$, that is, at time point $t_{46}$, a pulse occurs in the clock signal CLK2, and this pulse triggers an up edge occurring in the signal SKPIN (though, here, it is assumed that, after time point $t_{44}$, an up edge occurs in the skip signal SKP earlier than time point $t_{46}$.

As described above, in improved recovery control, in response to the skip signal SKP turning from high level to low level, the output transistor M1 is turned on immediately asynchronously with the clock signal CLK in basic switching control. In this way, in response to a drop in the output voltage $V_{OUT}$, the output capacitor C1 can be fed with electric charge promptly. It is thus possible to keep ripples in the output voltage $V_{OUT}$ low as compared with when reference recovery control is adopted.

An additional description will now be given of the operation of the controller 10 etc. The controller 10 is capable of performing, when the skip signal SKP is at a first level (e.g., low level), basic switching control in which it performs switching operation synchronous with the clock signal CLK (see FIGS. 6 and 8), and is capable of performing, when the skip signal SKP turns to a second level (e.g., high level) during basic switching control, pulse skip control in which it keeps suspended switching operation synchronous with the clock signal CLK (see FIG. 8). Thereafter, when the skip signal SKP turns from the second level (e.g., high level) to the first level (e.g., low level), the controller 10 turns on the output transistor M1 asynchronously with the clock signal CLK, in basic switching control (see FIG. 11).

More specifically, in the switching power supply device AA, when basic switching control is performed, a feedback control loop is formed such that, as the load current $I_{LD}$ increases, the error voltage $V_{CMP}$ varies in a first direction (e.g., rising direction) and that, as the load current Ii decreases, the error voltage $V_{CMP}$ varies in a second direction (e.g., falling direction) opposite to the first direction. The skip comparator 21 is so configured that, when the error voltage $V_{CMP}$ has varied in the second direction (e.g., falling direction) until the magnitude relationship between the error voltage $V_{CMP}$ and the skip threshold voltage $V_{TSKP}$ is reversed, the skip comparator 21 turns the skip signal SKP from a first level (e.g., low level) to a second level (e.g., high level) and that, when the error voltage $V_{CMP}$ has varied in the first direction (e.g., rising direction) until the magnitude relationship between the error voltage $V_{CMP}$ and the skip threshold voltage $V_{TSKP}$ is reversed, the skip comparator 21 turns the skip signal SKP from the second level (e.g., high level) to the first level (e.g., low level).

In addition, the error amplifier 11 is so configured that, as the output voltage $V_{OUT}$ falls, the error voltage $V_{CMP}$ varies in the first direction (e.g., rising direction). Accordingly, after the start of pulse skip control based on a second-level (e.g., high-level) skip signal SKP, as the output voltage $V_{OUT}$ falls, the error voltage $V_{CMP}$ varies in the first direction (e.g., rising direction), and when as a result the skip signal SKP turns from the second level (e.g., high level) to the first level (e.g., low level), the controller 10 turns on the output transistor M1 asynchronously with the clock signal CLK in basic switching control (see FIG. 11).

While the first and second levels of the skip signal SKP are, in the switching power supply device AA in FIG. 1, low and high levels respectively, the switching power supply device AA can be modified such that the first and second levels are high and low level respectively (the same applies to any of the other embodiments described later). Saying that the skip signal SKP is at a first or second level means, strictly taken, that the level of the skip signal equals the first or second level (the same applies to any other signal). It can also be understood that a first-level skip signal SKP is the skip signal SKP as it is when it has a first logic value and that a second-level skip signal SKP is the skip signal SKP as it is when it has a second logic value different from the first logic value (the same applies to any other signal). While the first and second directions in which the error voltage $V_{CMP}$ varies are, in the switching power supply device AA in FIG. 1, rising and falling directions respectively, the switching power supply device AA can be modified such that the first and second directions are falling and rising directions respectively (the same applies to any of the embodiments described later).

The controller 10 includes a specific-signal generator that generates a specific signal in response to the skip signal SKP turning from the second level (e.g., high level) to the first level (e.g., low level), and turns on the output transistor M1 based on the specific signal. The one-shot pulse generator 22 is an example of the specific-signal generator, and the one-shot pulse is an example of the specific signal. In the present invention, the specific signal is not limited to in the form of a pulse signal.

After turning on the output transistor M1 based on the specific signal (here, the one-shot pulse), the controller 10 can determine the turn-off timing of the output transistor M1 based on the result of comparison between the error voltage $V_{CMP}$ and the slope voltage $V_{SLP}$ by the main comparator 16 (see time point $t_{45}$ in FIG. 11).

FIG. 12 is a timing chart showing a case where the load current $I_{LD}$ is comparatively low and skip control and improved recovery control alternate. In FIG. 12, the reference signs 371, 372, and 373 identify three one-shot pulses that occur in the signal OSHT, and the reference signs 381, 382, 383 identify the set signals that are issued in response to the one-shot pulses 371, 372, and 373. In the case in FIG. 12, a one-shot pulse (e.g., 371) is issued in response to a down edge in the skip signal SKP, and a rise in the output voltage $V_{OUT}$ causes the skip signal SKP to turn back to high level. Thereafter, as the output voltage $V_{OUT}$ falls gradually, a one-shot pulse (e.g., 372) is issued again in response to a down edge in the skip signal SKP. Thereafter, similar operation repeats. In a case as shown in FIG. 12, operation in which the error voltage $V_{CMP}$ is stabilized around the skip threshold voltage $V_{TSKP}$ is achieved, and with the control signal CNT at high level, the slope voltage $V_{SLP}$ has a constant gradient; thus, the high-level period of the control signal CNT on every issuance of a one-shot pulse is substantially constant. Thus, it can be said that, in the case in FIG. 12, control substantially equivalent to constant on-time control is performed.

The issuance time intervals of the one-shot pulse depend on the load current $I_{LD}$, and as the load current $I_{LD}$ increases, the issuance time intervals of the one-shot pulse shorten. It is possible to make a transition, when the issuance time intervals have shortened to a predetermined time interval, to PWM control in which set signals are issued synchronously with the clock signal CLK2. Such PWM control is similar to basic switching control as described previously except that set signals are issued synchronously with the clock signal CLK2.

Second Embodiment

A second embodiment of the present invention will be described. The second embodiment, and also the third to sixth embodiments described later, is an embodiment based on the first embodiment. Accordingly, for such features as are not expressly mentioned in connection with the second to sixth embodiments, unless inconsistent, the corresponding description given in connection with the first embodiment applies to the second to sixth embodiments. In interpreting the second embodiment, for any features that contradict between the first and second embodiments, the corresponding description given in connection with the second embodiment can prevail (the same is true with the third to sixth embodiments described later). Unless inconsistent, any two or more of the first to sixth embodiments can be combined together.

FIG. 13 is a timing chart of control according to the second embodiment. Time point $t_{B1}$ in FIG. 13 corresponds to time point $t_{A4}$ (see FIG. 11) mentioned in connection with the first embodiment, and the operation up to time point $t_{B1}$ can be as described in connection with the first embodiment. At time point $t_{B1}$ a down edge occurs in the skip signal SKP and signal SKPIN, and the down edge in the skip signal SKP and signal SKPIN triggers a one-shot pulse 411 occurring in the signal OSHT. In response to the one-shot pulse 411 occurring in the signal OSHT, the set signal generator 17 keeps the signal SET at high level for momentary period; that is, it issues a set signal 431. The issuance of the set signal 431 triggers the output stage switching to the high-output state, and thereafter the slope voltage $V_{SLP}$ reaching the error voltage $V_{CMP}$ triggers a reset signal being issued, resulting in the output stage switching to the low-output state. These events are as described in connection with the first embodiment (the same applies to any other set signal mentioned later).

The set signal generator 17 sets the time point of occurrence of the one-shot pulse 411, that is, time point $t_{B1}$, as the operation start time point of an internal clock signal. In the example in FIG. 13, an internal clock signal of which the operation start time point is set at time point $t_{B1}$ is dealt with as the clock signal CLK2. As mentioned previously in connection with the first embodiment, the clock signal CLK2 has a predetermined frequency $f_{CLK2}$ (e.g., 300 kHz), and every period of the clock signal CLK2, a pulse occurs in the clock signal CLK2. Thus, at the time point that the length of time $T_{P2}$ corresponding to one period of the clock signal CLK2 has elapsed after time point $t_{B1}$, that is, at time point $t_{B2}$, a pulse 422 occurs in the clock signal CLK2, and thereafter, at the time point that the length of time $T_{P2}$ has once again elapsed, that is, at time point $T_{B3}$, a pulse 423 occurs in the clock signal CLK2.

As a situation different from what is shown in FIG. 13, consider a case where, after a one-shot pulse 411 occurs in response to a down edge in the skip signal SKP, before another pulse 422 occurs, a reset signal is issued, an up edge occurs in the skip signal SKP, a down edge occurs again in the skip signal SKP, and in response to the down edge occurring again, a one-shot pulse occurs again. Put otherwise, this is a case where, within a predetermined length of time of the time point, $t_{s1}$, of a down edge in the skip signal SKP (i.e., within the length of time corresponding to one period of the clock signal CLK2), a down edge occurs again in the skip signal SKP. In this case, the set signal generator 17 can issue a set signal in response to the one-shot pulse occurring again (the down edge occurring again in the skip signal SKP), then in response to the one-shot pulse occurring again, the output stage is turned to the high-output state.

The case described above corresponds to the case in FIG. 12. In the case in FIG. 12, after the one-shot pulse 371 occurs, before the length of time $T_{P2}$ corresponding to one period of the clock signal CLK2 elapses, a reset signal is issued, an up edge occurs in the skip signal SKP, and a down edge occurs again in the skip signal SKP, resulting in the one-shot pulse 372 occurring. Thus, the set signal generator 17 issues the set signal 382 in response to the one-shot pulse 372. The case in FIG. 12 corresponds to a case where the load current $I_{LD}$ is comparatively low and issuing a one-shot pulse once permits the output capacitor C1 to be charged sufficiently (i.e., a case where the output voltage $V_{OUT}$ is raised up to the target voltage $V_{TG}$).

In contrast, the case shown in FIG. 13 corresponds to a case where, starting around time point $t_{B1}$, the load current $I_{LD}$ is comparatively high and issuing a one-shot pulse once does not permit the output capacitor C1 to be charged sufficiently. Here, after time point $t_{B1}$, the skip signal SKP is kept at low level past time points $t_{B2}$ and $t_{B3}$.

In the case in FIG. 13, the occurrence of the pulse 422 in the clock signal CLK2 at time point $t_{B2}$ triggers the set signal generator 17 switching a clock mask signal XCLKMSK from low level to high level. The signal XCLKMSK is a signal that specifies whether or not to issue a set signal based on the clock signal CLK2, and is generated by the set signal generator 17. When the skip signal SKP is at high level, the signal XCLKMSK is at low level. If, within a predetermined length of time of the time point of a down edge in the skip signal SKP (i.e., within the length of time corresponding to one period of the clock signal CLK2), a down edge does not occur again in the skip signal SKP, an up edge occurs in the signal XCLKMSK.

Only when the signal XCLKMSK is at high level, a set signal is issued based on the clock signal CLK2. Accordingly, in the case in FIG. 13, at time point $t_{B2}$, a set signal 432 is issued synchronously with a pulse 422 in the clock signal CLK2, and at time point $t_{B3}$, a set signal 433 is issued synchronously with a pulse 423 in the clock signal CLK2. More precisely, when the signal XCLKMSK is at high level, a set signal is issued synchronously with a down edge in the clock signal CLK2. Thereafter, similar operation repeats.

Though not specifically shown in FIG. 12, the case in FIG. 12 assumes that the signal XCLKMSK is kept at low, level. When the signal XCLKMSK is at low level, the set signal is issued based on the one-shot pulse. A selector that issues a set signal by selectively using one of the one-shot pulse or the clock signal CLK2 in accordance with the signal XCLKMSK can be provided in the set signal generator 17.

As described above, if, within a predetermined length of time of the time point, $t_{B1}$, of a down edge in the skip signal SKP (i.e., within the length of time corresponding to one period of the clock signal CLK2), a down edge does not occur again in the skip signal SKP, the controller 10 judges that the load current $I_{LD}$ is comparatively high and, starting at the time point that the above-mentioned predetermined length of time has elapsed after time point $t_{B1}$, that is, starting at time point $t_{B2}$, the controller 10 starts PWM control of the output stage synchronous with the clock signal CLK2. This permits seamless switching of control. In PWM control synchronous with the clock signal CLK2, the PWM frequency (the frequency of pulse-width modulation) is fixed at the frequency $f_{CLK2}$, and the output duty of the output stage depends on the error voltage $V_{CMP}$ and the slope voltage $V_{SLP}$. That is, the PWM control performed starting at time point $t_{B2}$ current-mode PWM control with the PWM frequency at the frequency $f_{CLK2}$. The output duty of the output stage denotes the proportion of the on period of the output transistor M1 to one period of PWM control.

Third Embodiment

A third embodiment of the present invention will be described. The controller 10 can be configured to perform constant on-time control in which it keeps the output stage in the high-output state for a predetermined on time $T_{CON}$ synchronously with a one-shot pulse. That is, in the controller 10 according to the third embodiment, when a set signal is issued based on a one-shot pulse in response to a down edge in the skip signal SKP, the control signal generator 18 keeps the control signal CNT at high level for the on time $T_{CON}$, and thereafter keeps the control signal CNT at low level until a set signal is issued again. In this way, based on the one-shot pulse, the output transistor M1 is kept on for the on time $T_{CON}$, and then the output transistor M1 is turned off. The on time $T_{CON}$ can be a length of time that is determined based on the input voltage $V_{IN}$ and the output voltage $V_{OUT}$.

Constant on-time control in the third embodiment is depicted by a timing chart similar to that in FIG. 12. In the third embodiment, however, as mentioned above, the length of the on period of the output transistor M1 on every issuance of a one-shot pulse does not depend on the error voltage $V_{CMP}$ and the slope voltage $V_{SLP}$ but is fixed at the on time $T_{CON}$.

In the period in which constant on-time control based on the one-shot pulse is performed, the issuance time intervals of the one-shot pulse depends on the load current $I_{LD}$, and as the load current $I_{LD}$ increases, the issuance time intervals of the one-shot pulse shortens. It is possible to stop, when the issuance time intervals have shortened to a prescribed time interval, shortening the issuance time intervals of the one-shot pulse.

In constant on-time control, the switching frequency i.e., the frequency of the switching voltage $V_{SW}$) is unfixed or, even if an attempt is made to fix it, it is difficult to set it accurately. On the other hand, there are many applications in which a fixed switching frequency is preferable in a situation where the load current $I_{LD}$ is rather high. In those applications, it is preferable to adopt the control described in connection with the first or second embodiment.

Fourth Embodiment

A fourth embodiment of the present invention will be described. As shown in FIG. 14A, the controller 10 includes an operation mode setter 40. The power IC 1 operates in a plurality of modes including a normal mode and a stand-by mode. Based on the skip signal SKP, the operation mode setter 40) sets the operation mode to the normal mode or the stand-by mode.

The circuits in the power IC 1 are classified into a first circuit group and a second circuit group. As shown in FIG. 14B, in the normal mode (i.e., when the operation mode is set to the normal mode), the supply voltage is fed to the circuits constituting the first and second circuit groups, so that the circuits constituting the first and second circuit groups operate. On the other hand, in the stand-by mode (i.e., when the operation mode is set to the stand-by mode), while the supply voltage is fed to the circuits constituting the first circuit group so that the circuits constituting the first circuit group operate, the circuits constituting the second circuit group cease to operate. Accordingly, the power IC 1 consumes less electric power in the stand-by mode than in the normal mode. The circuits constituting the second circuit group can be kept inoperative by cutting the feeding of the supply voltage to the circuits constituting the second circuit group.

As shown in FIG. 14C, the first circuit group includes the error amplifier 11, the skip comparator 21, bias-related circuits, the internal power supply circuit 30, and the operation mode setter 40. The one-shot pulse generator 22 can also be included in the first circuit group. The bias-related circuits include a circuit that generates the reference voltage $V_{REF}$ (i.e., the reference voltage source 12) and a circuit that generates the skip threshold voltage $V_{TSKP}$.

Of the circuit included in the power IC 1, all or part of the circuits that are not included in the first circuit group belong to the second circuit group. For example, all or part of the slope voltage generator 15, the main comparator 16, the set signal generator 17, the control signal generator 18, the gate driver 19, and the reverse current detector 20 can belong to the second circuit group. The power IC 1 includes various protection circuits (not shown), and so long as doing so does not pose problems in terms of the specifications of the power IC 1, the protection circuits can be included in the second circuit group. This helps further reduce electric power consumption in the stand-by mode. Examples of protection circuits include a thermal shutdown circuit that monitors the temperature inside the power IC 1 to stop the operation of the entire power IC 1 if the temperature inside the power IC 1 becomes equal to or higher than a predetermined temperature, and an overcurrent protection circuit that brings the output stage into the Hi-Z state when an overcurrent passes in the transistor M1 or M2.

With reference to FIG. 15, how the operation mode is set will be described. The operation mode setter 40 sets the level of a signal DEEP based on the skip signal SKP. In reality, the level of the signal DEEP is set based on the signal SKPIN based on the skip signal SKP. Here, however, assuming that the skip signal SKP contains no noise, how the level of the signal DEEP is set in relation to the skip signal SKP will be described. The signal DEEP is basically kept at low level. When an up edge occurs in the skip signal SKP, the operation mode setter 40 starts a timer incorporated in it to measure the length of the period for which the skip signal SKP is kept at high level so that, when the condition that the skip signal SKIP is kept at high level for a predetermined set time $T_{DEEP}$ or more is fulfilled, the operation mode setter 40 switches the signal DEEP from the low level to high level. The just-mentioned measurement is performed by use of any of the clock signals generated within the power IC 1. After the signal DEEP switches to high level, when a down edge occurs in the skip signal SKP, the signal DEEP is switched to low level. When the signal DEEP is at low level, the operation mode is set to the normal mode, and when the signal DEEP is at high level, the operation mode is set to the stand-by mode.

Fifth Embodiment

A fifth embodiment of the present invention will be described. The power IC 1 can be configured to be capable of soft-starting operation whereby, when the switching power supply device AA starts up, the output voltage $V_{OUT}$ is raised gently from 0 V toward the target voltage $V_{TG}$. The fifth embodiment deals with techniques related to soft-starting operation. The operation described in connection with any of the first to fourth embodiments can be understood as the operation that proceeds after a signal SSEND, which will be described later, has turned to high level.

Figure 16:
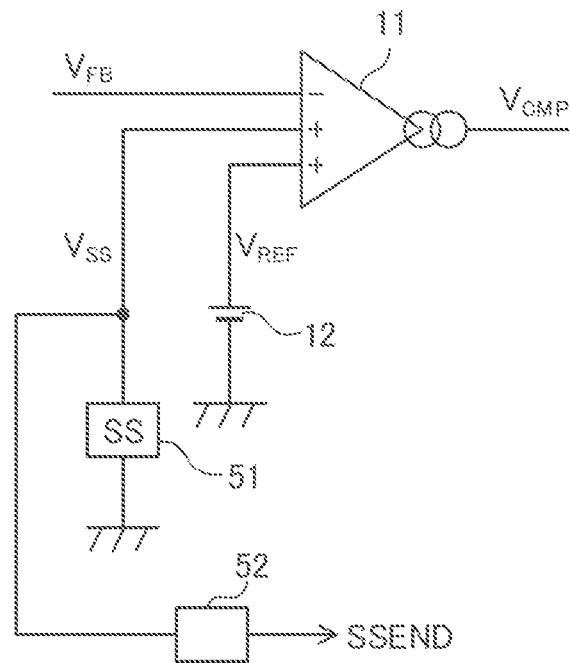
FIG. 16 is a configuration diagram of a part related to soft-starting operation in a fifth embodiment of the present invention.

To achieve soft-starting operation, as shown in FIG. 16, the controller 10 includes a soft-starting voltage generator 51 that generates a soft-starting voltage $V_{SS}$ and a circuit 52 that generates a signal SSEND in accordance with the soft-starting voltage $V_{SS}$, and the error amplifier 11 is provided with two non-inverting input terminals, namely a first and a second non-inverting input terminal. The first and second non-inverting input terminals of the error amplifier 11 are fed with the soft-starting voltage $V_{SS}$ and the reference voltage $V_{REF}$ respectively. As mentioned earlier, the inverting input terminal of the error amplifier 11 is fed with the feedback voltage $V_{FB}$.

As described above, the error amplifier 11 generates an error voltage $V_{CMP}$ commensurate with the difference between a negative-side target voltage and a positive-side target voltage, and here the lower of the soft-starting voltage $V_{SS}$ and the reference voltage $V_{REF}$ is used as the positive-side target voltage. The negative-side target voltage is the feedback voltage $V_{FB}$. Accordingly, during a period in which the soft-starting voltage $V_{SS}$ is lower than the reference voltage $V_{REF}$, the error amplifier 11 generates the error voltage $V_{CMP}$ in accordance with the difference between the feedback voltage $V_{FB}$ and the soft-starting voltage $V_{SS}$; during a period in which the soft-starting voltage $V_{SS}$ is higher than the reference voltage $V_{REF}$, the error amplifier 11I generates the error voltage $V_{CMP}$ in accordance with the difference between the feedback voltage $V_{FB}$ and the reference voltage $V_{REF}$. When $V_{SS}=V_{REF}$, one of the soft-starting voltage $V_{SS}$ and the reference voltage $V_{REF}$, is the positive-side target voltage.

Figure 17:
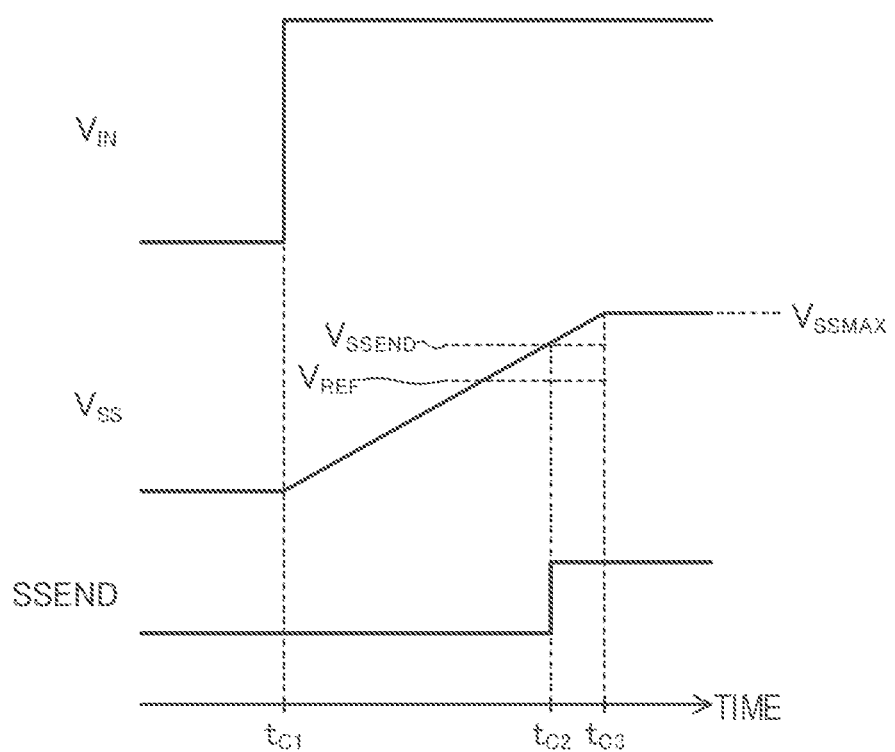
FIG. 17 is a timing chart related to soft-starting operation in the fifth embodiment of the present invention.

FIG. 17 is a timing chart showing how the switching power supply device AA starts up. Suppose that, at time point $t_{C1}$, the input voltage $V_{IN}$ supplied to the power IC 1 rises from 0 V (zero volts, to a predetermined positive direct-current voltage. Then, at time point $t_{C1}$, the power IC 1 starts up and, starting at time point $t_{C1}$, the generator 51 raises the soft-starting voltage $V_{SS}$ gradually from 0 V toward a predetermined positive voltage $V_{SS\_MAX}$. For example, the soft-starting voltage $V_{SS}$ can be generated with a constant-current circuit that generates a constant current and a capacitor that is charged by the constant current, and the capacitor for generating the soft-starting voltage $V_{SS}$ can be externally connected to the power IC 1. At time point $t_{C3}$, which occurs after time point $t_{C1}$, the soft-starting voltage $V_{SS}$ becomes just equal to the predetermined voltage $V_{SS\_MAX}$, and thereafter the soft-starting voltage $V_{SS}$ is kept at the predetermined voltage $V_{SS\_MAX}$. At time point $t_{C2}$, which occurs between time points $t_{C1}$ and $t_{C3}$, the soft-starting voltage $V_{SS}$ becomes just equal to a predetermined voltage $V_{SSEND}$, lower than the predetermined voltage $V_{SS\_MAX}$. When the soft-starting voltage $V_{SS}$ is lower than the predetermined voltage $V_{SSEND}$, the circuit 52 outputs a low-level signal SSEND, when the soft-starting voltage $V_{SS}$ is equal to or higher than the predetermined voltage $V_{SSEND}$, the circuit 52 outputs a high-level signal SSEND. A high-level signal SSEND signifies the completion of soft-starting operation. Here, $0<V_{REF}<V_{SSEND}<V_{SS\_MAX}$ holds. It can instead be that $V_{REF}=V_{SSEND}$.

As described above, at the start-up of the switching power supply device AA (i.e., at the start-up of the power IC 1, the generator 51 generates a soft-starting voltage $V_{SS}$ of which the potential rises gradually from a potential lower than the reference voltage $V_{REF}$ toward a potential ($V_{SS\_MAX}$) higher than the reference voltage $V_{REF}$, and thereby achieves soft-starting operation in which it raises the output voltage $V_{OUT}$ gradually from 0 V toward the target voltage $V_{TG}$.

Figures 18, 19:
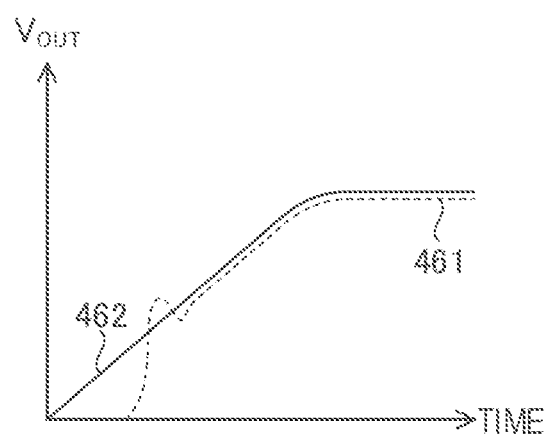
FIG. 18 is a diagram showing how an output voltage varies at the start-up of a switching power supply device in the fifth embodiment of the present invention.
FIG. 19 is a diagram showing how a skip threshold voltage is set in the fifth embodiment of the present invention.
Figure 20:
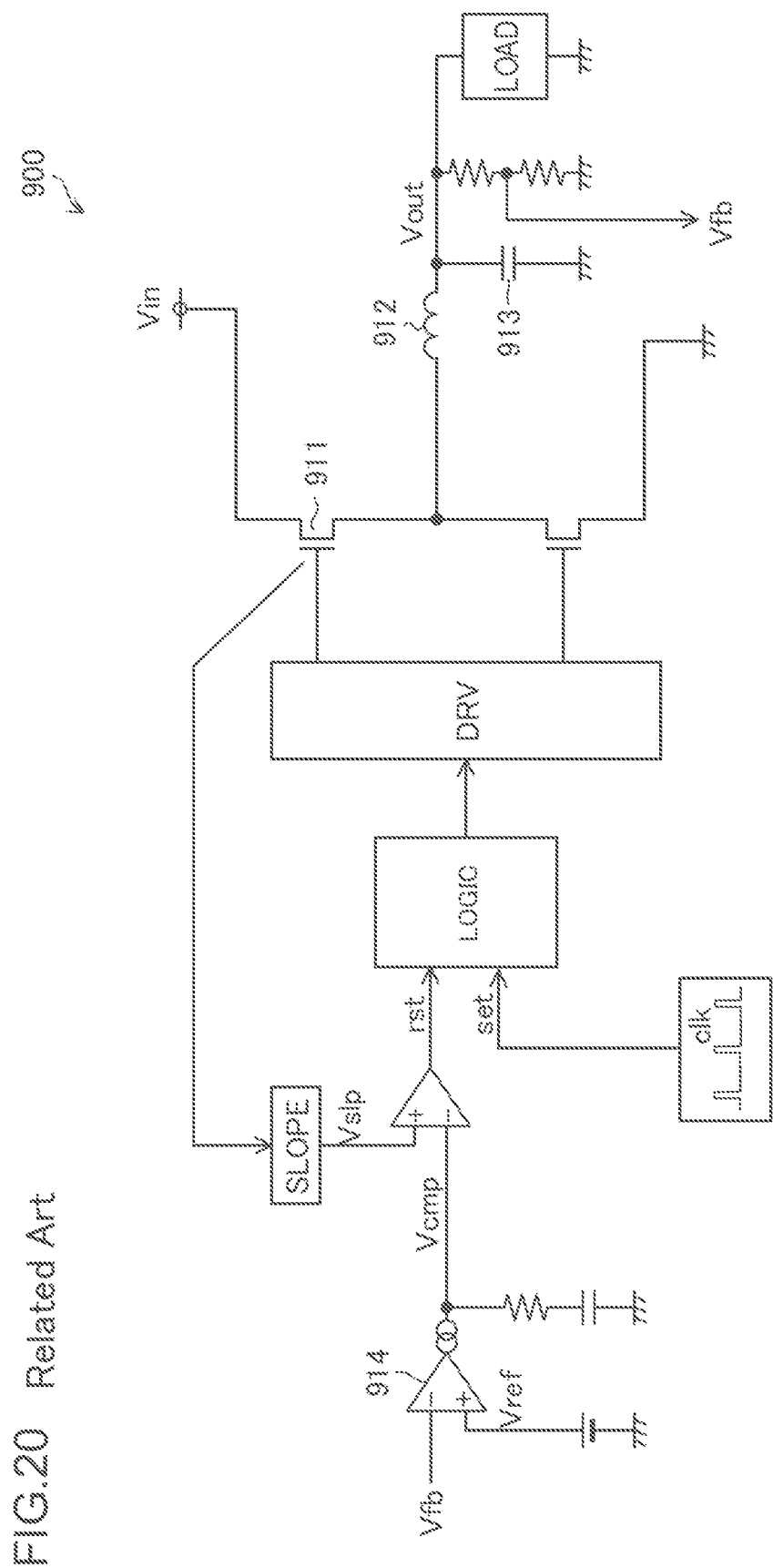
FIG. 20 is an overall configuration diagram of a switching power supply device according to art related to the present invention.

Starting at time point $t_{C1}$, the error voltage $V_{CMP}$ rises gradually from 0 V (zero volts) due to a current that is fed from the error amplifier 11 to the line LN1. In the circuit configuration in FIG. 1, until the error voltage $V_{CMP}$ reaches the skip threshold voltage $V_{TSKP}$, pulse skip control is in effect and thus the output transistor M1 does not turn on. Accordingly, if, for the sake of discussion, the skip threshold voltage $V_{TSKP}$ is excessively high during soft-starting operation, it is only when the soft-starting voltage $V_{SS}$ has become correspondingly high that the output transistor M1 turns on, and this may spoil smooth rising of the output voltage $V_{OUT}$. That is, as shown in FIG. 18, the output voltage $V_{OUT}$ at start-up may have a waveform as indicated by a broken lime 461 deviated from an ideal waveform as indicated by a solid line 462.

To cope with that, in the power IC 1, the skip threshold voltage $V_{TSKP}$ is set lower during soft-starting operation than after completion of soft-starting operation. This helps give the output voltage $V_{OUT}$ a smooth waveform at start-up as indicated by the solid line 462 in FIG. 18. Specifically, the controller 10 can be provided with a voltage setting circuit (not shown) that sets the skip threshold voltage $V_{TSKP}$, when the signal SSEND is at low level, at a predetermined voltage $V_{TSKP1}$ and, when the signal SSEND is at high level, at a predetermined voltage $V_{TSKP2}$ (see FIG. 19). Here, $0<V_{TSKP1}<V_{TSKP2}$ holds, where the voltages $V_{TSKP1}$ and $V_{TSKP2}$ are, for example, 30 mV and 120 mV respectively. That is, the controller 10 sets the skip threshold voltage $V_{TSKP}$ lower during, than after, the soft-starting period up to when the soft-starting voltage $V_{SS}$ reaches the predetermined voltage $V_{SSEND}$ equal to or higher than the reference voltage $V_{REF}$.

Sixth Embodiment

The sixth embodiment of the present invention will be described. The sixth embodiment deals with applied techniques, modified techniques, and the like that are applicable to any of the first to fifth embodiments described above.

The switching power supply device AA can be incorporated in any electric appliance that has a load LD. The switching power supply device AA functions especially beneficially in applications that demand suppressed ripples in the output voltage $V_{OUT}$ and lower electric power consumption under a light load, but this does not limit the use of the switching power supply device AA. Examples of electric appliances that can incorporate the switching power supply device AA include PLCs (programmable logic controllers). In such cases, a microcomputer or an ASIC (application-specific integrated circuit) provided in the PLC can be the load LD.

Other examples of electric appliances that can incorporate the switching power supply device AA includes household electric appliances such as refrigerators and washing machines. An illuminator for illuminating the interior of a refrigerator can be the load LD. In a refrigerator, when the door is closed, the illuminator is extinguished and when the door is open, the illuminator is lit. Thus, in an application where an illuminator is the load LD of the switching power supply device AA, the load current $I_{LD}$ varies greatly, and such variation can be effectively coped with by smooth switching of control as described in connection with the embodiment described above.

As mentioned earlier, the circuit elements of the power IC 1 are formed as a semiconductor integrated circuit, and this semiconductor integrated circuit is sealed in a casing (package) made of resin to form a semiconductor device. Instead, a plurality of discrete components can be used to build a circuit equivalent to the circuit inside the power IC 1. Some of the circuit elements (e.g., transistors M1 and M2) that are described as being included in the power IC 1 above can be provided outside and externally connected to the power IC 1. Conversely, some of the circuit elements that are described as being provided outside the power IC 1 above can be provided inside the power IC 1.

The switching power supply device AA incorporates a circuit for a switching power supply. The power IC 1 can be understood to correspond to the circuit for a switching power supply. A circuit that results by excluding from the power IC 1 some of its constituent elements can be understood to correspond to the circuit for a switching power supply. The power IC 1 described above together with any element outside it can be understood to correspond to the circuit for a switching power supply.

With respect to any signal or voltage, the relationship of its high and low levels can be reversed within the scope of what is disclosed herein.

Any of the transistors mentioned above can be of any type. For example, any transistor mentioned above as a MOSFET can be replaced with a junction FET, an IGBT (insulated-gate bipolar transistor), or a bipolar transistor. Any transistor has a first electrode, a second electrode, and a control electrode. In an FET, one of the first and second electrodes corresponds to the drain, the other of them corresponds to the source, and the control electrode corresponds to the gate. In an IGBT, one of the first and second electrodes corresponds to the collector, the other of them corresponds to the emitter, and the control electrode corresponds to the gate. In a bipolar transistor that does not belong to the IGBT, one of the first and second electrodes corresponds to the collector, the other of them corresponds to the emitter, and the control electrode corresponds to the base.

Although the above description deals with, as examples, configurations where the present invention is applied to a synchronous-rectification step-down switching power supply device, this is in no way meant to limit the scope of the present invention; the present invention can be applied to asynchronous-rectification switching power supply devices, or to step-up and step-up/down switching power supply devices.

The embodiments of the present invention allow for many modifications made as necessary within the scope of the technical concept set forth in the appended claims. The embodiments described above are merely examples of how the present invention can be implemented, and the senses of the terms used to define the present invention and its features are not limited to those in which they are used in the description of the embodiments given above. All specific values mentioned in the above description are merely examples, and can naturally be altered to different values.

What is claimed is:

1. A circuit for a switching power supply, the circuit generating an output voltage from an input voltage through switching operation by an output transistor, the circuit comprising:
    a controller including
        an error amplifier configured to generate an error voltage commensurate with a difference between a feedback voltage commensurate with the output voltage and a reference voltage and
        a slope voltage generator configured to generate a slope voltage commensurate with a current passing in the output transistor,
    the controller being configured to control the output transistor based on the error voltage and the slope voltage,
    wherein
    the controller further includes a skip comparator configured to generate a skip signal based on a result of comparison between the error voltage and a predetermined skip threshold voltage, and
    the controller is configured
        when the skip signal is at a first level, to perform basic switching control in which the controller performs the switching operation synchronous with a clock signal,
        when the skip signal turns from the first level to a second level different from the first level during the basic switching control, to perform skip control in which the controller stops the switching operation synchronous with the clock signal, and
        thereafter when the skip signal turns from the second level to the first level, to turn on the output transistor asynchronously with the clock signal in the basic switching control.

2. The circuit for a switching power supply according to claim 1, wherein
    in the basic switching control, as a current through a load supplied with the output voltage increases, the error voltage varies in a first direction and, as the current through the load decreases, the error voltage varies in a second direction opposite to the first direction,
    the skip comparator is configured,
        when the error voltage varies in the second direction until a magnitude relationship between the error voltage and the skip threshold voltage is reversed, to turn the skip signal from the first level to the second level and,
        when the error voltage varies in the first direction until the magnitude relationship between the error voltage and the skip threshold voltage is reversed, to turn the skip signal from the second level to the first level,
    the error amplifier is configured to make the error voltage vary in the first direction as the output voltage falls, and
    the controller is configured, after the skip control is started, when as a result of the output voltage falling and accordingly the error voltage varying in the first direction the skip signal turns from the second level to the first level, to turn on the output transistor asynchronously with the clock signal in the basic switching control.

3. The circuit for a switching power supply according to claim 1, wherein
    the controller includes a specific-signal generator configured to generate a specific signal in response to the skip signal turning from the second level to the first level, and
    the controller is configured to turn on the output transistor based on the specific signal.

4. The circuit for a switching power supply according to claim 3, wherein
    the controller is configured, after turning on the output transistor based on the specific signal, to determine turn-off timing of the output transistor based on a result of comparison between the error voltage and the slope voltage.

5. The circuit for a switching power supply according to claim 4, wherein
    the controller is configured, if within a predetermined time of a time point that the skip signal turns from the second level to the first level, the skip signal does not turn again from the second level to the first level, to thereafter perform PWM control of the output transistor at a predetermined frequency based on the error voltage and the slope voltage.

6. The circuit for a switching power supply according to claim 5, wherein
the controller is configured, if within the predetermined time of the time point that the skip signal turns from the second level to the first level, the skip signal turns again from the second level to the first level, to turn on the output transistor again based on the specific signal in response to the skip signal turning so again.

7. The circuit for a switching power supply according to claim 3, wherein
the controller is configured to keep the output transistor on for a predetermined on period based on the specific signal and thereafter turns off the output transistor.

8. The circuit for a switching power supply according to claim 1, further comprising an operation mode setter configured to set an operation mode of the circuit for a switching power supply,
wherein
the operation mode setter is configured to set the operation mode to
a first mode in which the operation mode setter enables, along with the error amplifier and the skip comparator, a particular circuit in the circuit for a switching power supply to operate or
a second mode in which the operation mode setter enables the error amplifier and the skip comparator to operate while disabling the particular circuit from operating so as to reduce electric power consumption in the circuit for a switching power supply as compared with in the first mode, and
the operation mode setter is configured, if with the operation mode set to the first mode after the skip signal turns from the first level to the second level the skip signal is kept at the second level for a predetermined time or more, to switch the operation mode to the second mode.

9. The circuit for a switching power supply according to claim 1, wherein
the controller further includes a soft-starting voltage generator configured, at start-up of the circuit for a switching power supply, to generate a soft-starting voltage of which a potential rises gradually from a potential lower than the reference voltage toward a potential higher than the reference voltage,
the error amplifier is configured, when the soft-starting voltage is lower than the reference voltage, to generate the error voltage commensurate with a difference between the feedback voltage and the soft-starting voltage and, when the soft-starting voltage is higher than the reference voltage, to generate the error voltage commensurate with a difference between the feedback voltage and the reference voltage,
the skip comparator is configured, when the error voltage is higher than the skip threshold voltage, to output the skip signal at the first level and, when the error voltage is lower than the skip threshold voltage, to output the skip signal at the second level, and
the controller is configured to set the skip threshold voltage lower during, than after, a period up to when the soft-starting voltage reaches a predetermined voltage equal to or higher than the reference voltage.

10. The circuit for a switching power supply according to claim 1, wherein
the circuit for a switching power supply is formed using a semiconductor integrated circuit.

* * * * *